(12) United States Patent
Schultz et al.

(10) Patent No.: US 8,583,802 B2
(45) Date of Patent: Nov. 12, 2013

(54) MULTIMEDIA OUTBOUND NOTIFICATION

(75) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1033 days.

(21) Appl. No.: 11/961,419

(22) Filed: Dec. 20, 2007

(65) Prior Publication Data

US 2009/0164580 A1 Jun. 25, 2009

(51) Int. Cl.
*G06F 15/16* (2006.01)

(52) U.S. Cl.
USPC .......................................... 709/227

(58) Field of Classification Search
None
See application file for complete search history.

(56) References Cited

U.S. PATENT DOCUMENTS

| 5,990,886 | A  | * | 11/1999 | Serdy et al. .................... 715/752 |
| 7,053,753 | B2 | * | 5/2006  | Kacalek et al. ............ 455/435.1 |
| 2002/0085701 | A1 | * | 7/2002  | Parsons et al. ........... 379/211.01 |
| 2003/0069002 | A1 | * | 4/2003  | Hunter et al. ................. 455/404 |
| 2003/0174817 | A1 | * | 9/2003  | Luneau et al. ............. 379/88.19 |

* cited by examiner

*Primary Examiner* — Thomas Dailey
*Assistant Examiner* — Nam Tran

(57) ABSTRACT

A device may include a memory and a processor. The memory may store first information relating to a trigger, second information relating to multimedia content, and a destination party identifier. The memory may further associate the first information, the second information, and the one or more destination party identifiers. The processor may detect that the trigger has been satisfied, and obtain, in response to detecting that the trigger has been satisfied, the multimedia content based on the second information. The processor may also establish a session with a user device using the destination party identifier, and provide the multimedia content to the user device.

23 Claims, 33 Drawing Sheets

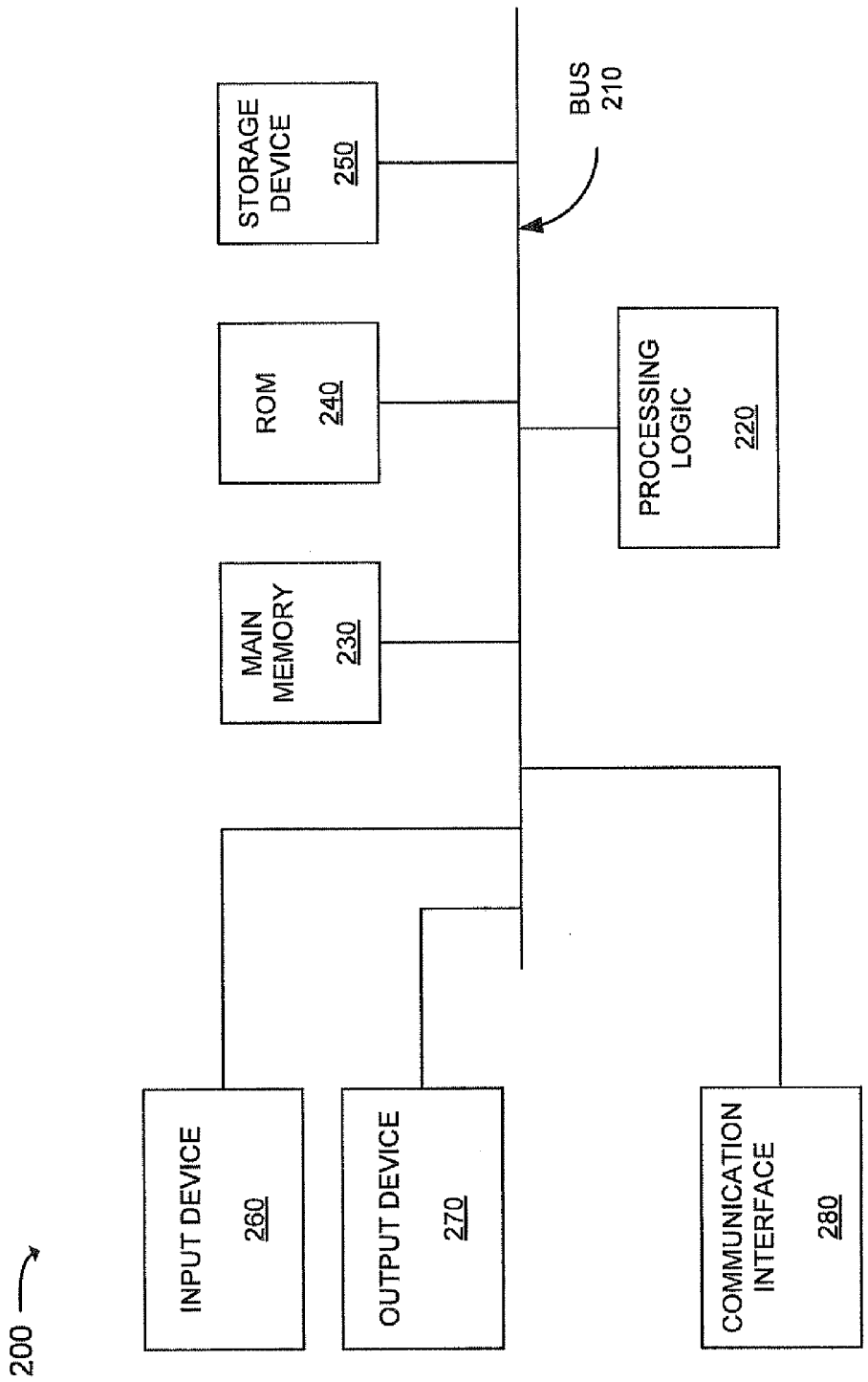

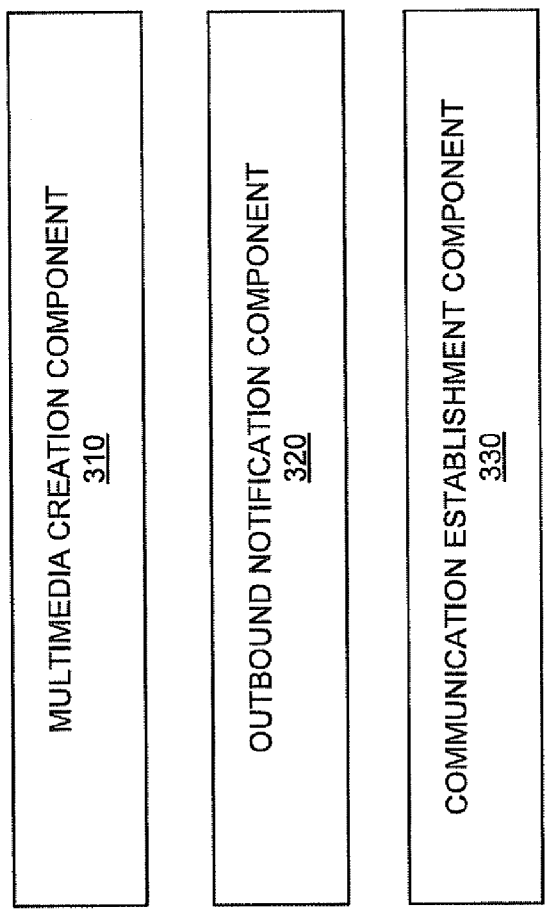

FIG. 4B

| TRIGGER 460 | DESTINATION PARTY IDENTIFIER(S) 470 | CONTENT IDENTIFIER 480 |
|---|---|---|
| 911 | LIST OF IDENTIFIERS FOR EMPLOYEES | MAP OF EXITS, AUDIO OF EVACUATION INSTRUCTIONS |
| TRIGGER | IDENTIFIER(S) | IDENTIFIER |
| TRIGGER | IDENTIFIER(S) | IDENTIFIER |
| ... | ... | ... |
| TRIGGER | IDENTIFIER(S) | IDENTIFIER |

450

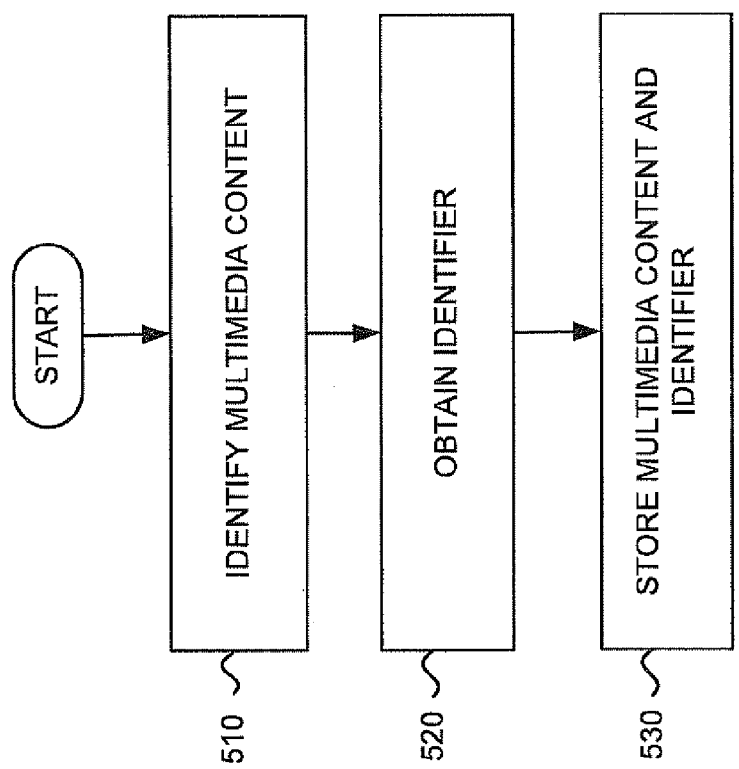

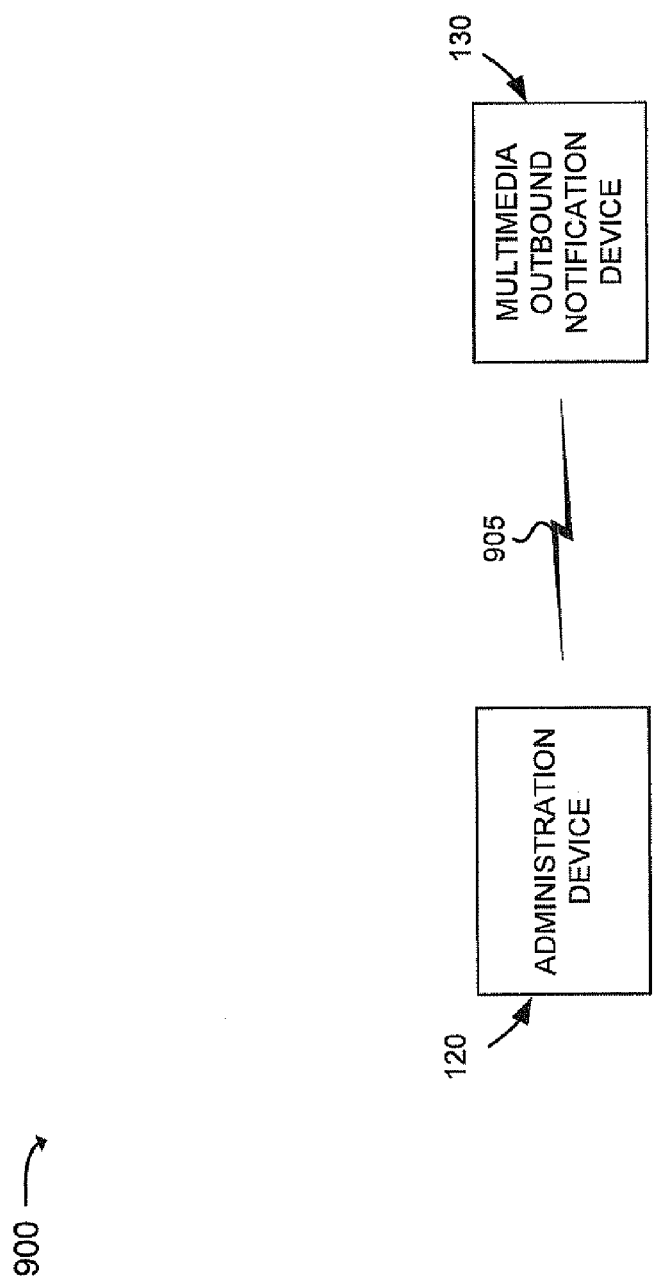

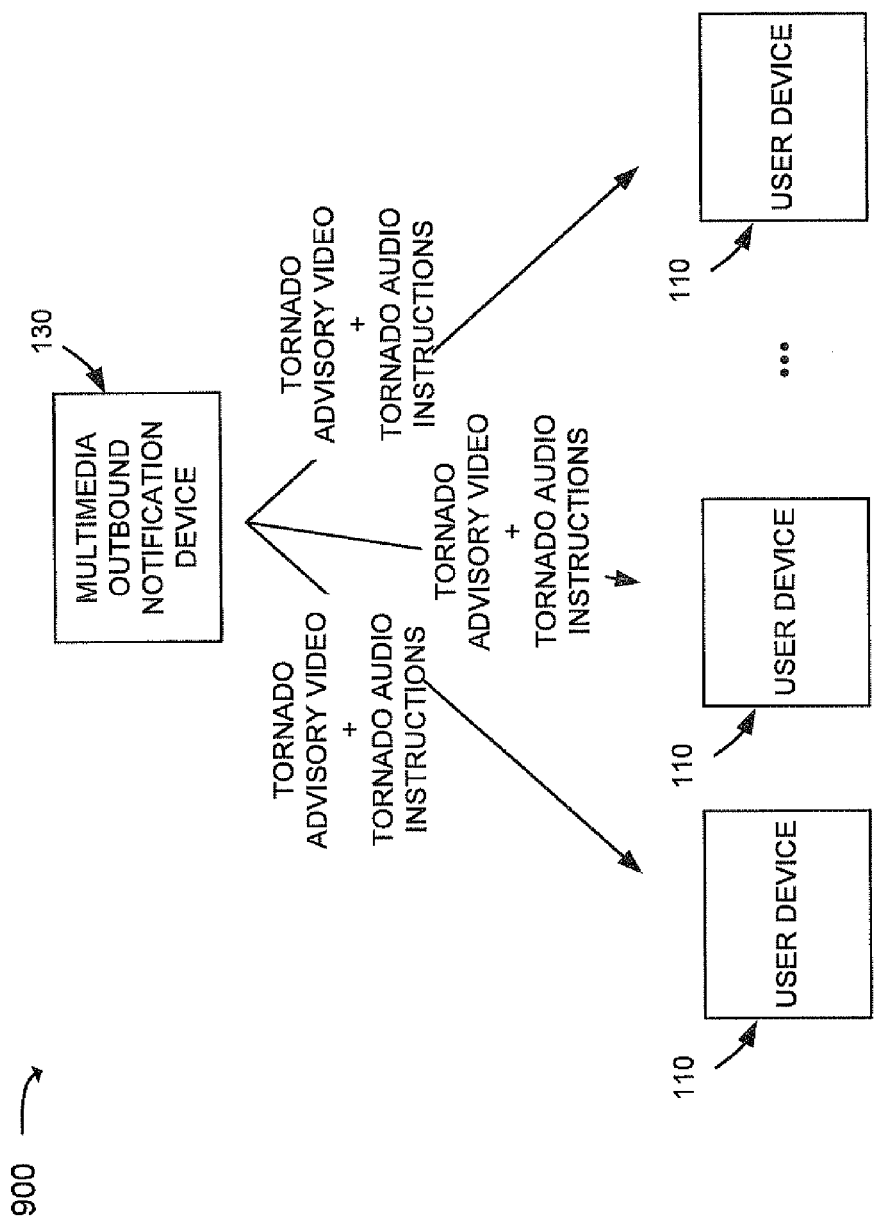

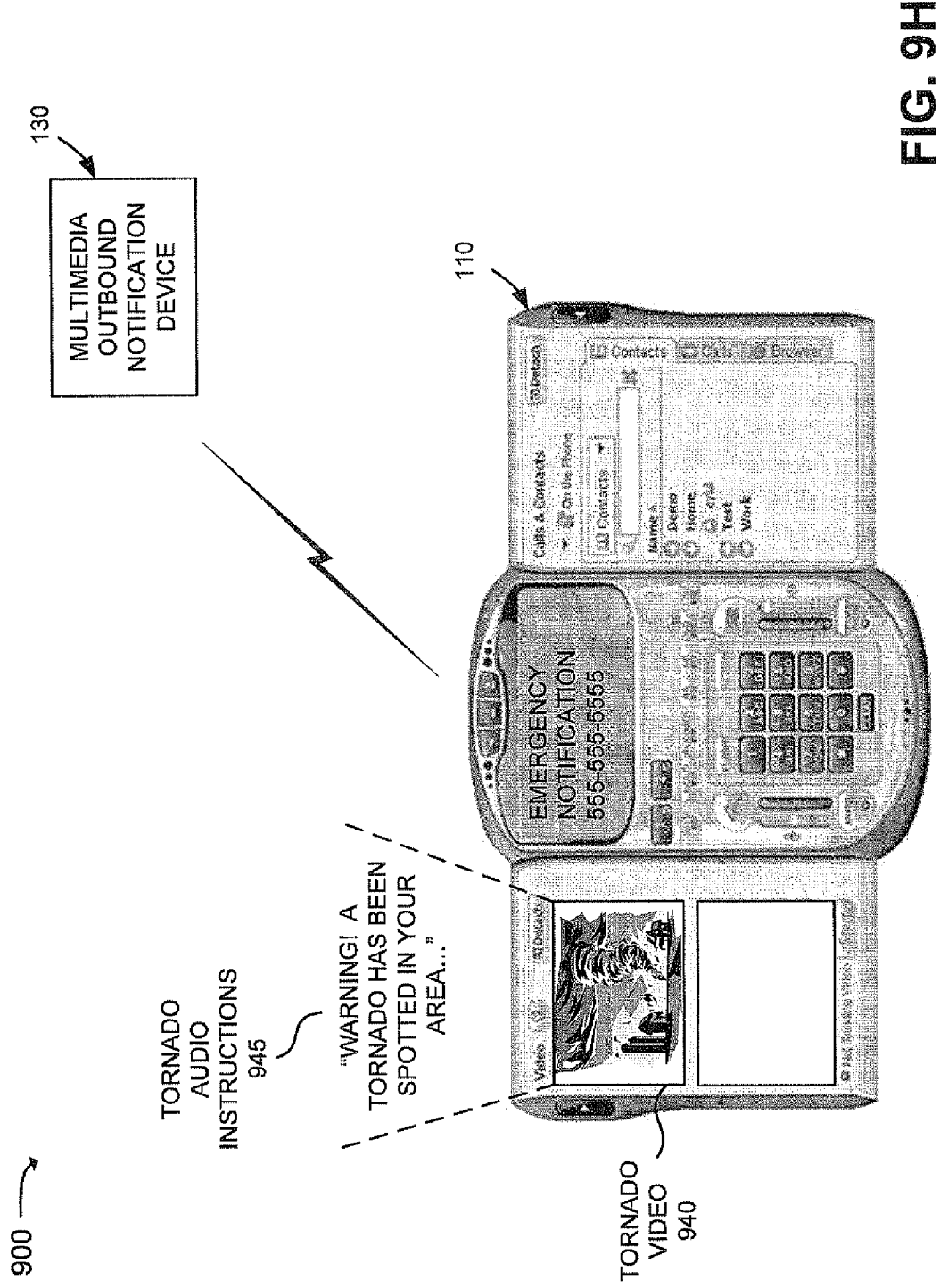

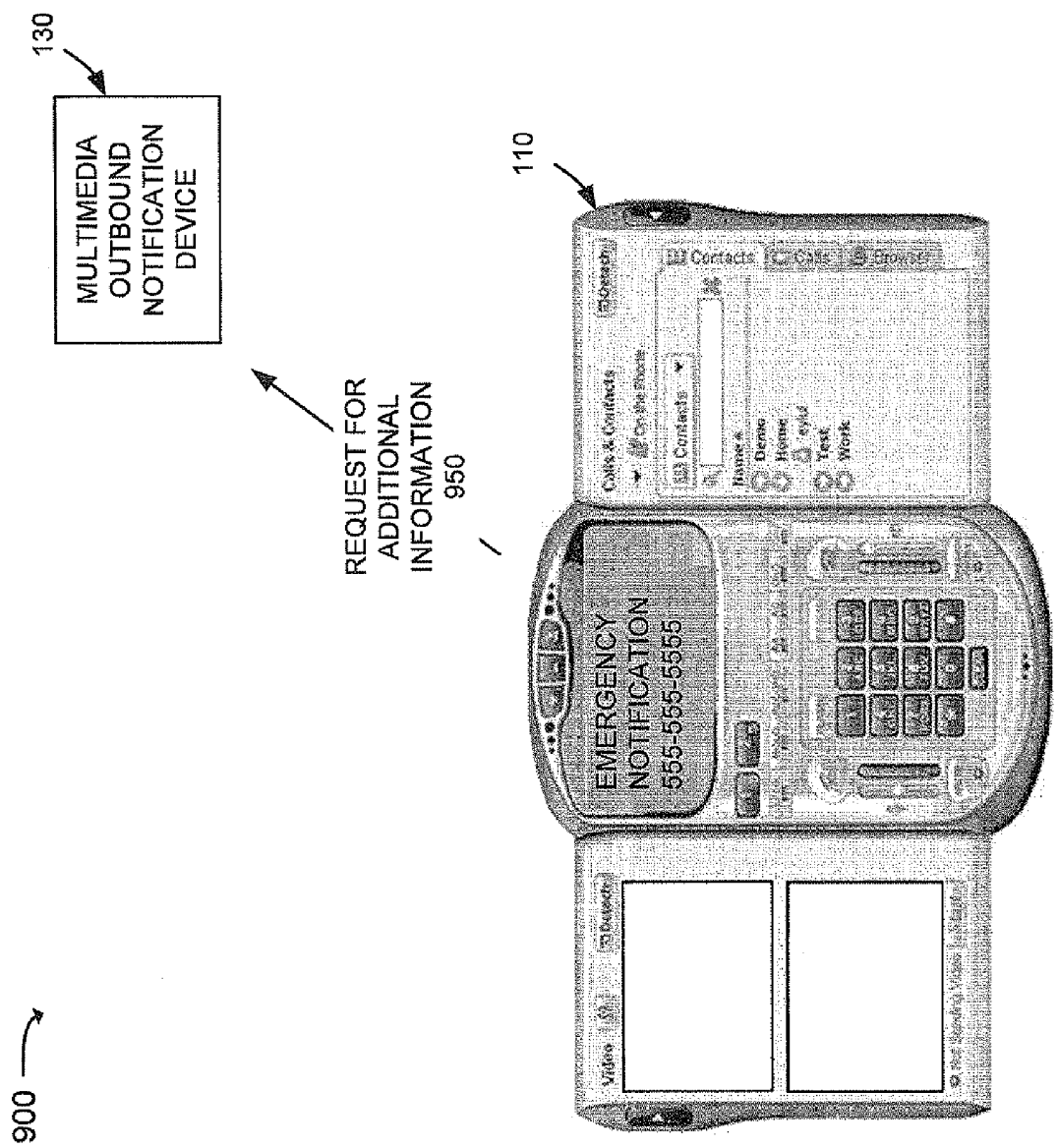

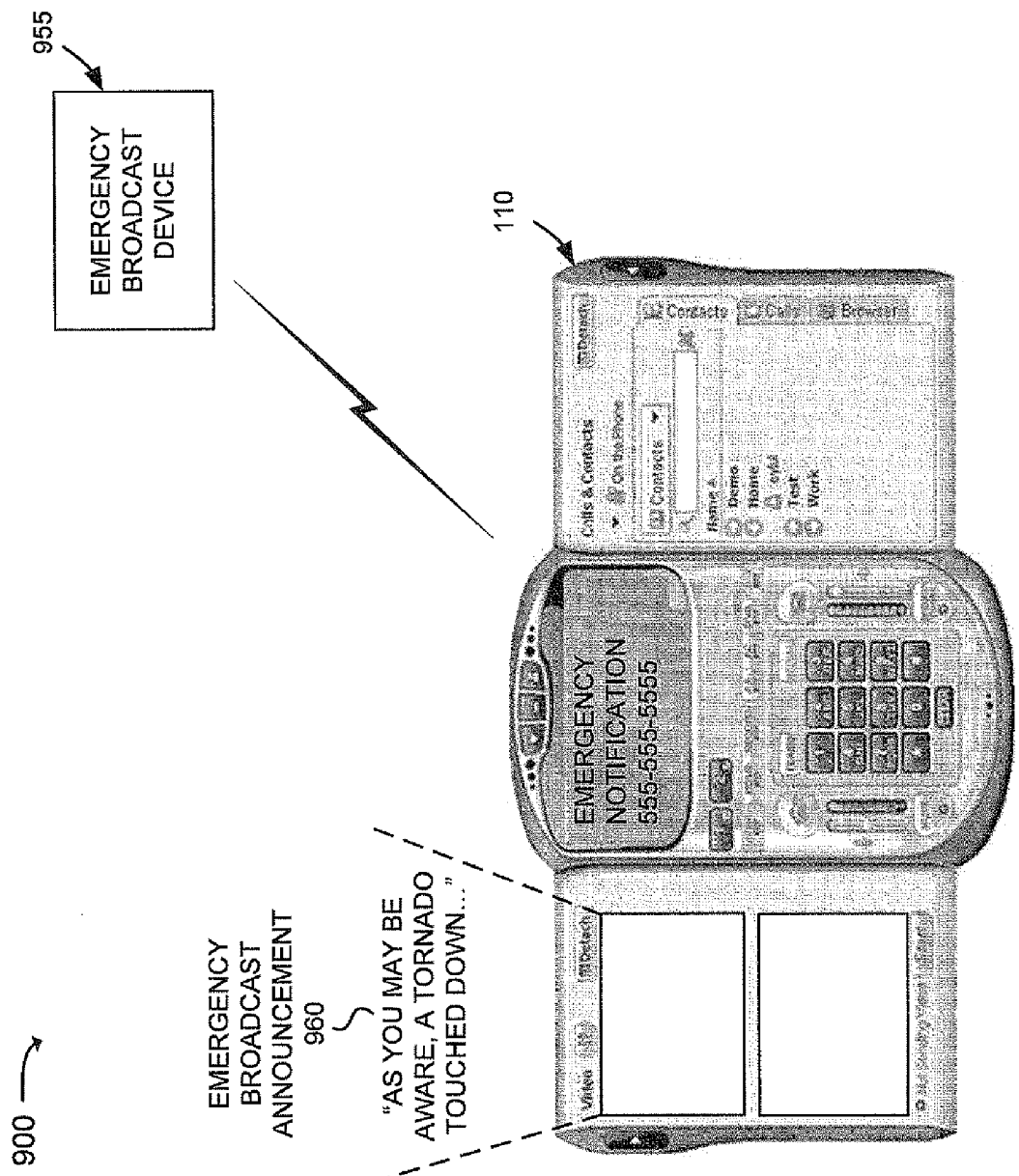

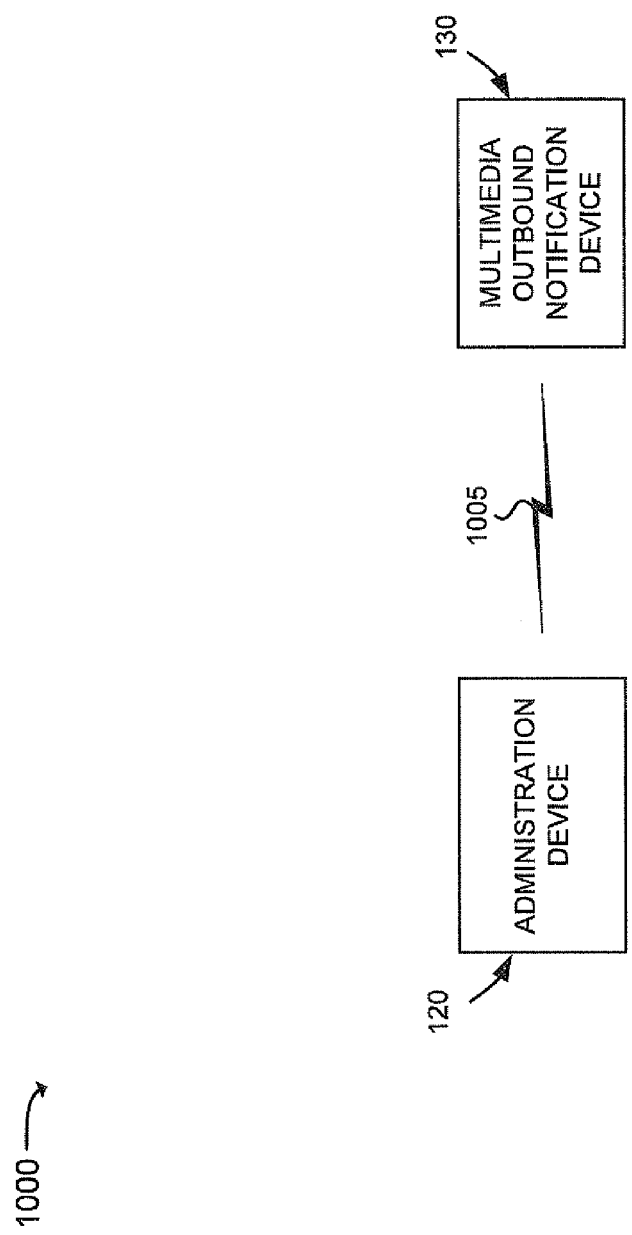

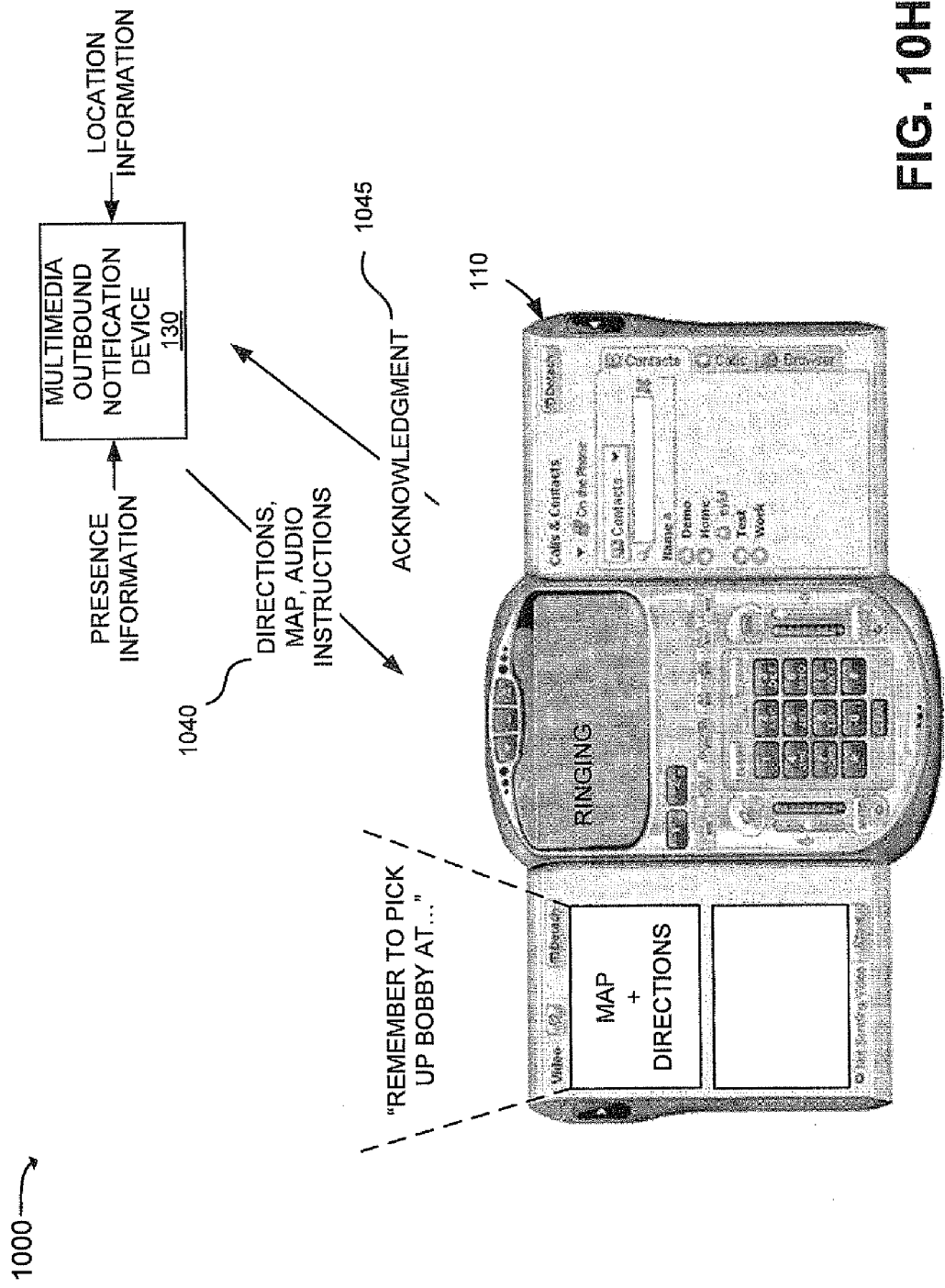

MULTIMEDIA OUTBOUND NOTIFICATION

BACKGROUND INFORMATION

A government agency or school district may have a notification system in place that automatically places telephone calls to predetermined telephone numbers. For example, for the government agency, the predetermined telephone numbers may include telephone numbers for individuals living in a particular county. The government agency may configure the notification system to automatically place telephone calls to the telephone numbers and play a pre-recorded message. Similarly, a school district may configure the notification system to automatically place telephone calls to households having children who attend the schools in the school district and play a pre-recorded message in the event, for example, when the schools are closing due to inclement weather. These outbound notifications are limited to audio messages.

BRIEF DESCRIPTION OF THE DRAWINGS

FIG. 2 is an exemplary block diagram of a device consistent with exemplary embodiments;

FIG. 3 is an exemplary functional diagram of a portion of the multimedia outbound notification device of FIG. 1;

FIGS. 4A-4B are exemplary diagrams of portions of databases that may be associated with the multimedia outbound notification device of FIG. 1;

FIG. 5 is a flow chart of an exemplary process for creating content according to an exemplary embodiment;

FIGS. 9A-9J illustrate a first example of the exemplary processes of FIGS. 6 and 8; and FIGS. 10A-10I illustrate a second example of the exemplary processes of FIGS. 6 and 8.

DETAILED DESCRIPTION OF PREFERRED EMBODIMENTS

Figure 1:
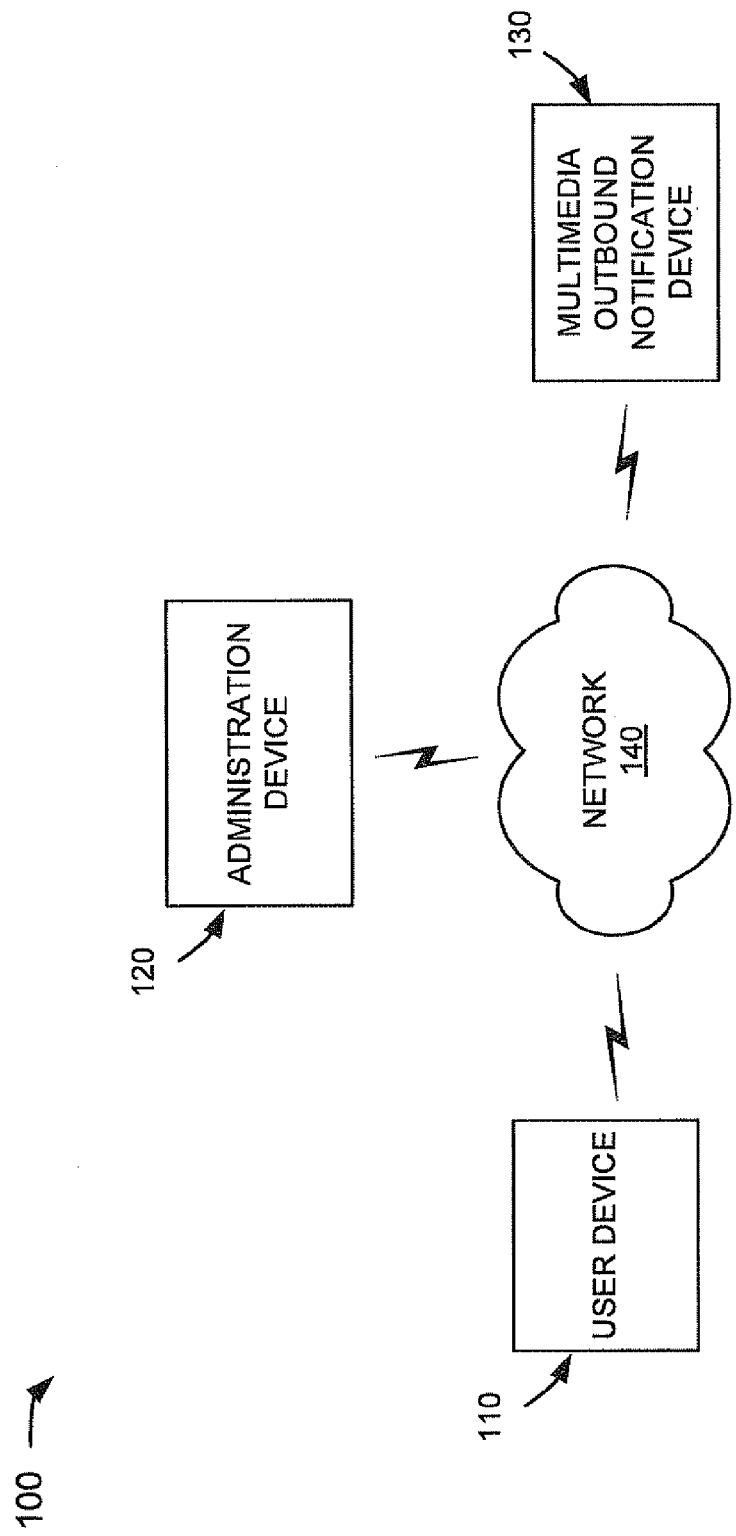
FIG. 1 is an exemplary network in which systems and methods, consistent with exemplary embodiments, may be implemented.

The following detailed description of exemplary embodiments refers to the accompanying drawings. The same reference numbers in different drawings may identify the same or similar elements. Also, the following detailed description does not limit the invention.

Embodiments described herein are directed to a multimedia outbound notification device that provides multimedia content to users on a scheduled basis or an ad hoc basis. A user may interact with the multimedia outbound notification device to specify multimedia content that is to be provided to particular users and when that multimedia content is to be provided to the particular users.

The following examples illustrate possible uses of the multimedia outbound notification device. In a first example, an enterprise organization may have a facility emergency evacuation notification service. If a fire broke out in the facility, an emergency notification could be activated to immediately send personalized instructions to all personnel included in a facility notification list. In addition, personalized information, such as a location of the fire and a nearest safe emergency exit (e.g., based on user's presence state and location), can be sent in a real-time multimedia session. These rich multimedia sessions can include content relevant to the fire, such as a video animation of individual fire exit routes. Emergency routes may be based on real-time information about the emergency event (e.g., the fire), such that the personnel are routed away from the fire.

An example of a business use of the multimedia outbound notification device may include notifying a traveling sales representative of an important new client visit added to traveling sales representative's business trip. In this case, an administrator may initiate a multimedia notification that includes the new client's name, photograph, driving directions to the client's location, meeting details, etc. The sales representative's presence status and location may be used to enrich the content delivered to the traveling sales representative.

An example of consumer use of the multimedia outbound notification device may include a wife notifying her husband that he has to pick up his child at a soccer game. This notification may include, for example, location-based driving directions (e.g., based on presence status and location of the husband), a map of the soccer fields indicating where the child will be, and a meeting time.

Another example of consumer use of the multimedia outbound notification device may include a husband configuring the multimedia outbound notification device to provide a scheduled multimedia greeting to his wife on their anniversary. This notification may include, for example, a video created by the husband, along with their favorite song and a personalized voice message. At the scheduled time, multimedia outbound notification device may establish a session with a device associated with the wife and provide the multimedia content.

A final example of the use of the multimedia outbound notification device may include a user subscribing to a traffic notification service. The subscriber may configure the multimedia outbound notification device to provide real-time traffic notifications with alternate routes suggestions (e.g., provided as streaming video or current location-based directions). If, for example, there was an accident on the subscriber's normal commuting route, the multimedia outbound notification device may be configured to initiate a notification to the subscriber with an alternate route. By incorporating location information for the subscriber into the notification process, the multimedia outbound notification device may determine whether the accident affects the subscriber's commute based on the user's location (e.g., if the user is already past the accident, the multimedia outbound notification device may not send a notification to the subscriber regarding the accident). The multimedia outbound notification device may provide the subscriber with the ability to choose to view location-based driving directions or real-time streaming traffic camera video either through the original notification or via a session transfer (e.g., transfer the session between the subscriber and the multimedia outbound notification device to a traffic camera video device).

A "multimedia outbound notification device," as broadly described herein may include one or more components located on a user's device and/or one or more components located on one or more network devices, such as a server. Thus, a "multimedia outbound notification device" may include components located on a single device or on multiple (possibly remote) devices. For explanatory purposes, the multimedia outbound notification device will be described as being located on a network device, such as a server.

FIG. 1 is an exemplary network 100 in which systems and methods, consistent with exemplary embodiments, may be implemented. As illustrated, network 100 may include a user device 110, an administration device 120, a multimedia outbound notification device 130, and a network 140. The number of user devices 110, administration devices 120, multimedia outbound notification devices 130, and networks 140 illustrated in FIG. 1 is provided for simplicity. In practice, there may be more user devices 110, administration devices 120, multimedia outbound notification devices 130, and/or networks 140.

User device 110 may include a client entity capable of receiving multimedia content. An entity may be defined as a device, such as a computer or another type of computation or communication device, a thread or process running on one of these devices, and/or an object executable by one of these devices. In one embodiment, user device 110 may include a personal computer, a laptop, a wireless device (e.g., a cellular telephone, a personal digital assistant (PDA), etc.), a telephone device (such as a Plain Old Telephone System (POTS) telephone, a Session Initiation Protocol (SIP) telephone, etc.), a set-top box that provides network access, an Internet Protocol (IP) Multimedia Subsystem (IMS) client, and/or any other type of device that may interact with another device, such as multimedia outbound notification device 130. User device 110 may connect to network 140 via wired and/or wireless connections.

Administration device 120 may include a client entity capable of interacting with multimedia outbound notification device 130 to set up the delivery of multimedia content to user device 110. As indicated above, an entity may be defined as a device, such as a computer or another type of computation or communication device, a thread or process running on one of these devices, and/or an object executable by one of these devices. In one embodiment, administration device 120 may include a personal computer, a laptop, a wireless device (e.g., a cellular telephone, a PDA, etc.), a telephone device (such as a POTS telephone, a SIP telephone, etc.), a set-top box that provides network access, an IMS client, and/or any other type of device that may interact with another device, such as multimedia outbound notification device 130. Administration device 120 may connect to network 140 via wired and/or wireless connections.

Multimedia outbound notification device 130 may include a server entity. As indicated above, an entity may be defined as a device, such as a computer or another type of computation or communication device, a thread or process running on one of these devices, and/or an object executable by one of these devices. In one embodiment, multimedia outbound notification device 130 may receive content and/or information identifying content and may provide content (possibly in real time) based on triggers specified by a user, such as a user of administration device 120. Multimedia outbound notification device 130 may connect to network 140 via wired and/or wireless connections.

Network 140 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an IMS network, a private network, the Internet, an intranet, and/or another type of network or combination of networks.

In some embodiments, one or more components of network 100 may perform one or more of the tasks described as being performed by one or more other components of network 100.

FIG. 2 is an exemplary block diagram of a device 200 in one embodiment. Device 200 may correspond to user device 110, administration device 120, and/or multimedia outbound notification device 130. As illustrated, device 200 may include a bus 210, processing logic 220, a main memory 230, a read only memory (ROM) 240, a storage device 250, an input device 260, an output device 270, and/or a communication interface 280. In one embodiment, device 200 may include fewer, additional, or different components than those illustrated in FIG. 2.

Bus 210 may include a path that permits communication among the components of device 200. Processing logic 220 may include a processor, a microprocessor, or other types of processing logic, such as an application specific integrated circuit (ASIC), a field programmable gate array (FPGA), etc., that may interpret and execute instructions. Main memory 230 may include a random access memory (RAM) or another type of dynamic storage device that may store information and instructions for execution by processing logic 220. ROM 240 may include a ROM device or another type of static storage device that may store static information and instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, a camera, an audio/video recorder, etc. Output device 270 may include a mechanism that outputs information to the operator, including a display, a printer, a speaker, etc. Communication interface 280 may include any transceiver-like mechanism that enables device 200 to communicate with other devices and/or systems via a network, such as network 140.

As will be described in detail below, device 200 may perform certain operations. Device 200 may perform these and other operations in response to processing logic 220 executing software instructions contained in a computer-readable medium, such as main memory 230. A computer-readable medium may be defined as a physical and/or logical memory device or a carrier wave.

The software instructions may be read into main memory 230 from another computer-readable medium, such as storage device 250, or from another device via communication interface 280. The software instructions contained in main memory 230 may cause processing logic 220 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

FIG. 3 is an exemplary functional diagram of a portion of multimedia outbound notification device 130 according to an exemplary embodiment. As illustrated, multimedia outbound notification device 130 may include a multimedia creation component 310, an outbound notification component 320, and a communication establishment component 330. In other embodiments, multimedia outbound notification device 130 may include fewer, additional, or different components than illustrated in FIG. 3. Moreover, one or more of the components illustrated in FIG. 3 may additionally and/or alternatively be implemented within another device, such as administration device 120.

Multimedia creation component 310 may include one or more components that allow a user to create and store multimedia content to be provided to a user device, such as user device 110. In one embodiment, multimedia creation component 310 may allow a user to combine different types of content (e.g., audio files, image files, video files, text files, and/or other types of files, content from one or more external sources, such as content from a web site, etc.) to create multimedia content. The content may include static content and/or dynamic content. For example, a user of administration device 120 may configure multimedia creation component 310 to obtain a current location of a user of user device 110 and use that location to obtain driving directions from the location of the user to a particular destination. Moreover, the user of administration device 120 may configure multimedia creation component 310 to combine the driving directions with other content, such as audio instructions, a map of the destination, etc. In some embodiments, a user may upload content to multimedia creation component 310 or purchase content from multimedia outbound notification device 130 and/or from another source. In addition, a user may specify to outbound notification component 320 a location from which outbound notification component 320 is to retrieve content.

Outbound notification component 320 may include one or more components that allow a user of administration device 120 to define (e.g., in the form of triggers or on-demand) when particular content is to be provided to particular users. The triggers may be based on one more static and/or dynamic factors. For example, a user may define a trigger based on a time of day, day of year, a code (or other type of input) that is provided by a user of administration device 120, etc. Moreover, outbound notification component 320 may include one or more components that allow a user to associate multimedia content and destination party identifiers with created triggers and to detect when the triggers have been satisfied.

Communication establishment component 330 may include one or more components capable of establishing a session with a user device, such as user device 110. In one embodiment, communication establishment component 330 may establish a session with a user device 110 in response to information from outbound notification component 320 (e.g., information associated with the user of user device 110 (e.g., a telephone number, a Uniform Resource Indicator (URI), an electronic mail (e-mail) address, an Instant Messaging (IM) address, etc.). Moreover, communication establishment component 330 may provide multimedia content to user device 110 in response to information from outbound notification component 320 (e.g., information identifying the multimedia content to be provided). In one embodiment where a user of administration device 120 indicates that particular multimedia content is to be provided to more than one destination party, communication establishment component 330 may simultaneously establish sessions with multiple user devices 110 (associated with the destination parties). In some embodiments, communication establishment component 330 may modify content based on the capabilities of a user device 110. For example, communication establishment component 330 may convert particular content from a first format to a second format (e.g., a data file to an audio file, etc.) based on the capabilities of a user device 110. Additionally or alternatively, communication establishment component 330 may translate all or a portion of the multimedia content provided to a user device 110 from a first language to a second language based on a language preference provided by the destination party or the user of administration device 120.

Also, in some embodiments, communication establishment component 330 may allow a user of user device 110 to transfer a session that has been established between multimedia outbound notification device 130 and user device 110. For example, in the sales representative example given above, the sales representative may decide he/she needs additional product information for his/her newly added hot prospect meeting. The sales representative may say or key in an indicator that causes communication establishment component 330 to connect the sales representative with the initiator of the multimedia outbound notification that the sales representative received. As another example, in the emergency notification scenario, the recipient could provide an indication that causes communication establishment component 330 to transfer the recipient's session to a conference bridge where information about the emergency event is being provided or to an appropriate news streaming video service.

In some embodiments, one or more components of the above portion of multimedia outbound notification device 130 may perform one or more of the tasks described as being performed by one or more other components of the above portion of multimedia outbound notification device 130.

Figure 4A:
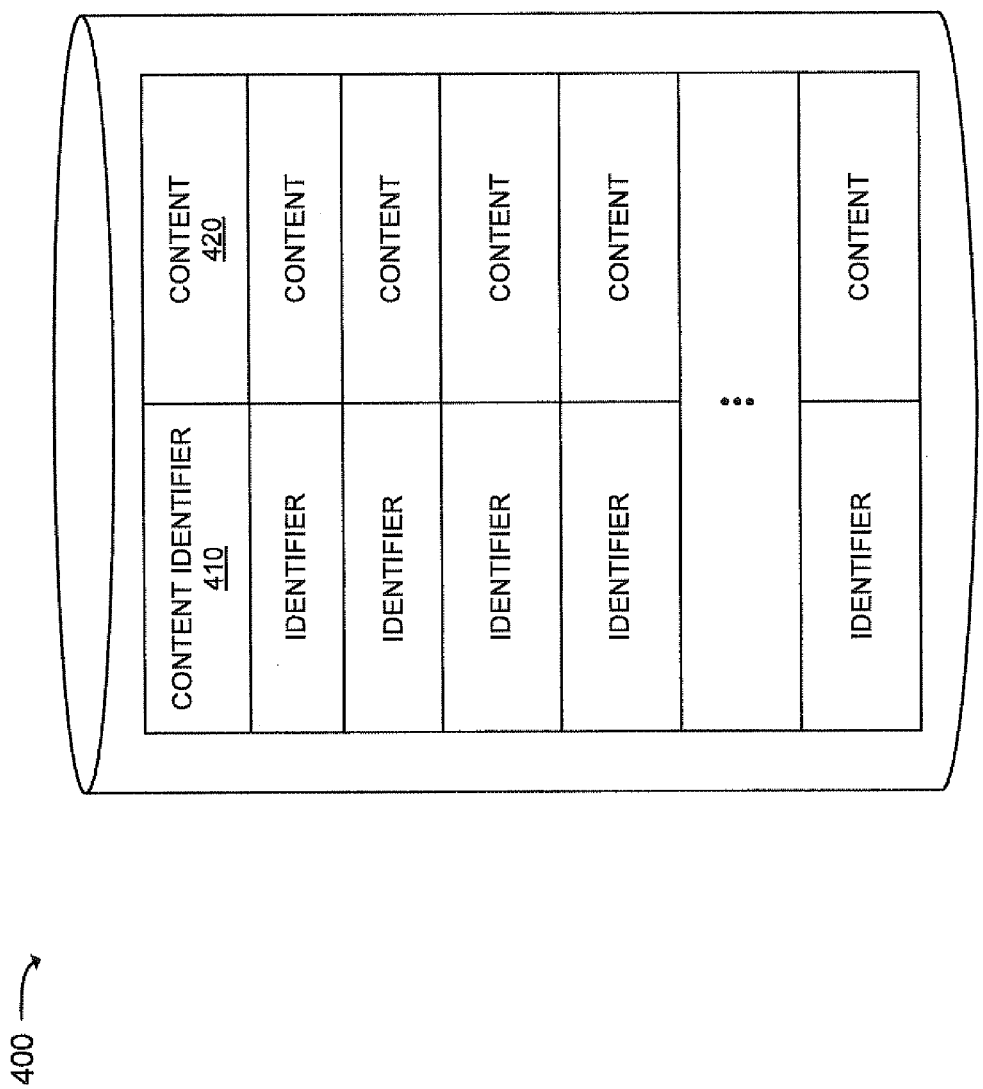

FIG. 4A is an exemplary diagram of a portion of a first database 400 that may be associated with multimedia outbound notification device 130. In addition or alternatively, database 400 may be associated with another device, such as administration device 120. While one database is described below, it will be appreciated that database 400 may include multiple databases stored locally at multimedia outbound notification device 130 (and/or administration device 120), or stored at one or more different and possibly remote locations.

As illustrated, database 400 may maintain a group of entries in the following exemplary fields: a content identifier field 410 and a content field 420. Database 400 may maintain additional or different information than that illustrated in FIG. 4A.

Content identifier field 410 may store a sequence of characters that identifies content that a user has created (e.g., via administration device 120). The sequence of characters may be automatically generated or supplied by the user.

Content field 420 may store content or one or more links to content that is associated with the identifier in content identifier field 410. The content may include static content and/or dynamic content. The static content may include, for example, one or more stored image files, audio files, video files, text files, etc. The dynamic content may include, for example, content that is dynamically captured from one or more external sources, such as web sites, Really Simple Syndication (RSS) feeds, etc. The dynamically captured content may include, for example, directions (e.g., driving directions) from a detected location of a user, a live video stream, and/or any other type of dynamic content. Additionally or alternatively, the dynamic content may include dynamic selection of static content. For example, the content in content field 420 may include static content (e.g., one or more image files, audio files, video files, text files, etc.) that is selected from a location (e.g., main memory 230 and/or storage device 250) within multimedia outbound notification device 130 or external from multimedia outbound notification device 130 based on some factor (e.g., presence and location information associated with the user of user device 110).

In one embodiment, content field 420 may additionally store content information indicating how the dynamic content is to be dynamically combined to render a final content product. For example, the content information in content field 420 may identify that an emergency video (with an audio announcement) is to be provided to user device 110, followed by a map showing where the closest exits are in a building (e.g., based on presence and location associated with the user of user device 110). Thus, the final content product in content field 420 may include static and/or dynamic content that may have been previously combined or that may be combined in a dynamic way.

FIG. 4B is an exemplary diagram of a portion of a second database 450 that may be associated with multimedia outbound notification device 130. In addition or alternatively, database 450 may be associated with another device, such as administration device 120. While one database is described below, it will be appreciated that database 450 may include multiple databases stored locally at multimedia outbound notification device 130 (and/or administration device 120), or stored at one or more different and possibly remote locations.

As illustrated, database 450 may maintain a group of entries in the following exemplary fields: a trigger field 460, a destination party identifier(s) field 470, and a content identifier field 480. Database 450 may maintain additional or different information than that illustrated in FIG. 4B.

Trigger field 460 may store information identifying triggers, created by a user associated with administration device 120, which indicates when particular content is to be provided to users. The triggers may be based on one more static and/or dynamic factors. For example, a trigger may be based on a time of day, a day of year, a code (or other input) that is provided by a user, one or more external factors (e.g., a factor relating to the status of a fire alarm, a factor relating to a current weather condition, a factor relating to a stock, a group of stocks, the stock market, etc., a factor relating to a sports team or group of sports teams, and/or other types of factors), etc.

Destination party identifier(s) field 470 may store one or more sequences of characters associated with users. Each sequence of characters may correspond to, for example, a name, a telephone number, a URI, an e-mail address, an IM address, and/or other identifiers that may be used for establishing a session. Content identifier 480 may store one or more identifiers that correspond to the identifiers in content identifier field 410 (FIG. 4A).

FIG. 5 is a flow chart of an exemplary process for creating content in exemplary embodiments. In one embodiment, the exemplary process of FIG. 5 may be performed by multimedia outbound notification device 130. In another embodiment, some or all of the exemplary process described below may be performed by another device, such as administration device 120, or combination of devices.

The exemplary process may begin with multimedia outbound notification device 130 receiving information identifying static and/or dynamic multimedia content (block 510). In one embodiment, multimedia outbound notification device 130 (e.g., via multimedia creation component 310) may provide a user with one or more graphical user interfaces that allow the user to identify static and/or dynamic content that is to be combined to form a final content product. In some embodiments, a user may upload content to multimedia outbound notification device 130, may identify content stored at multimedia outbound notification device 130, may identify content to multimedia outbound notification device 130 from a pay or free web site, and/or may identify content in other ways.

Multimedia outbound notification device 130 (e.g., via multimedia creation component) may aggregate the identified content based on user specifications to create a final content product. In one embodiment, multimedia outbound notification device 130 (e.g., via multimedia creation component 310) may provide a user with one or more graphical user interfaces that allow the user to combine the identified static and/or dynamic content to form multimedia content. The static and/or dynamic content may include content of the same media type or different media types. In other instances, the multimedia content may include links to various content and instructions as to how that content is to be combined to form the final content product. In these instances, multimedia outbound notification device 130 may combine the multimedia content in real time to form the final content product.

Multimedia outbound notification device 130 may obtain an identifier for the multimedia content (block 520). The identifier may include a unique set of characters that is provided by the user who created or provided the multimedia content or automatically generated by multimedia outbound notification device 130.

Multimedia outbound notification device 130 may store the multimedia content and identifier (block 530). The multimedia content may include stored content and/or one or more links to dynamic content that is part of the final content product. In one embodiment, multimedia outbound notification device 130 may store the multimedia content in a database, such as database 400.

Figure 6:
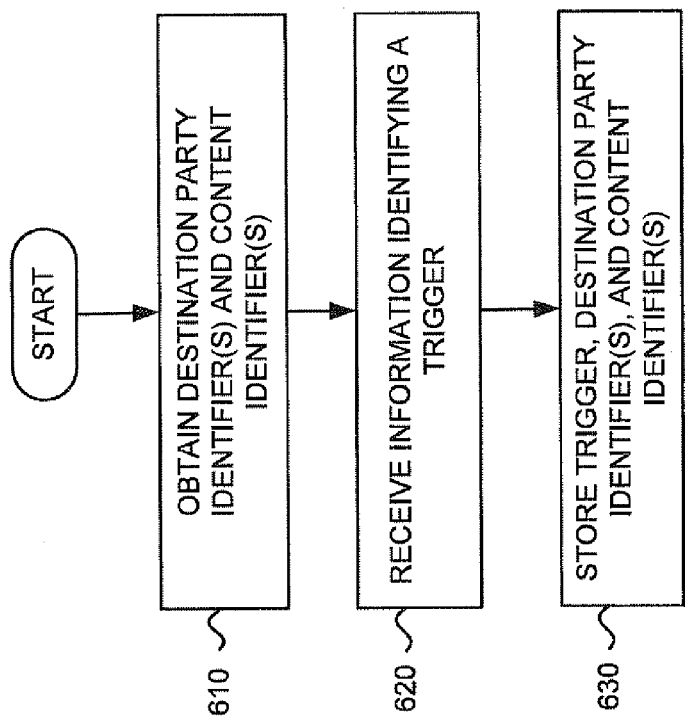
FIG. 6 is a flow chart of an exemplary process for defining parameters for a multimedia outbound notification according to an exemplary embodiment.

FIG. 6 is a flow chart of an exemplary process for associating triggers with destination party identifiers and final content products in exemplary embodiments. In one embodiment, the exemplary process of FIG. 6 may be performed by multimedia outbound notification device 130. In another embodiment, some or all of the exemplary process described below may be performed by another device, such as administration device 120, or combination of devices.

The exemplary process may begin with multimedia outbound notification device 130 obtaining destination party identifier(s) and content identifier(s) (block 610). For example, multimedia outbound notification device 130 (e.g., via outbound notification component 320) may provide a user of administration device 120 with one or more graphical user interfaces that allow the user to specify one or more destination party identifiers (e.g., one or more telephone numbers, URIs, IP addresses, etc.) associated with a destination party (or parties) to which content is to be provided. Additionally or alternatively, multimedia outbound notification device 130 may provide one or more graphical user interfaces that allow the user to specify a geographic area for which destination party identifiers are to be obtained. In addition, multimedia outbound notification device 130 (e.g., via outbound notification component 320) may provide a user of administration device 120 with one or more graphical user interfaces that allow the user to specify content to be provided to the destination party (or parties).

Multimedia outbound notification device 130 may receive information defining a trigger (block 620). In one embodiment, multimedia outbound notification device 130 (e.g., via outbound notification component 320) may provide a user with one or more graphical user interfaces that allow the user to specify the factors that define the trigger. As indicated above, the factors may include static and/or dynamic factors.

Multimedia outbound notification device 130 may store the received destination party identifier(s) and the content identifier(s) with the trigger (block 630). For example, multimedia outbound notification device 130 may store the trigger, the destination party identifier(s), and the content identifier(s) in a database, such as database 450.

Figure 7A:
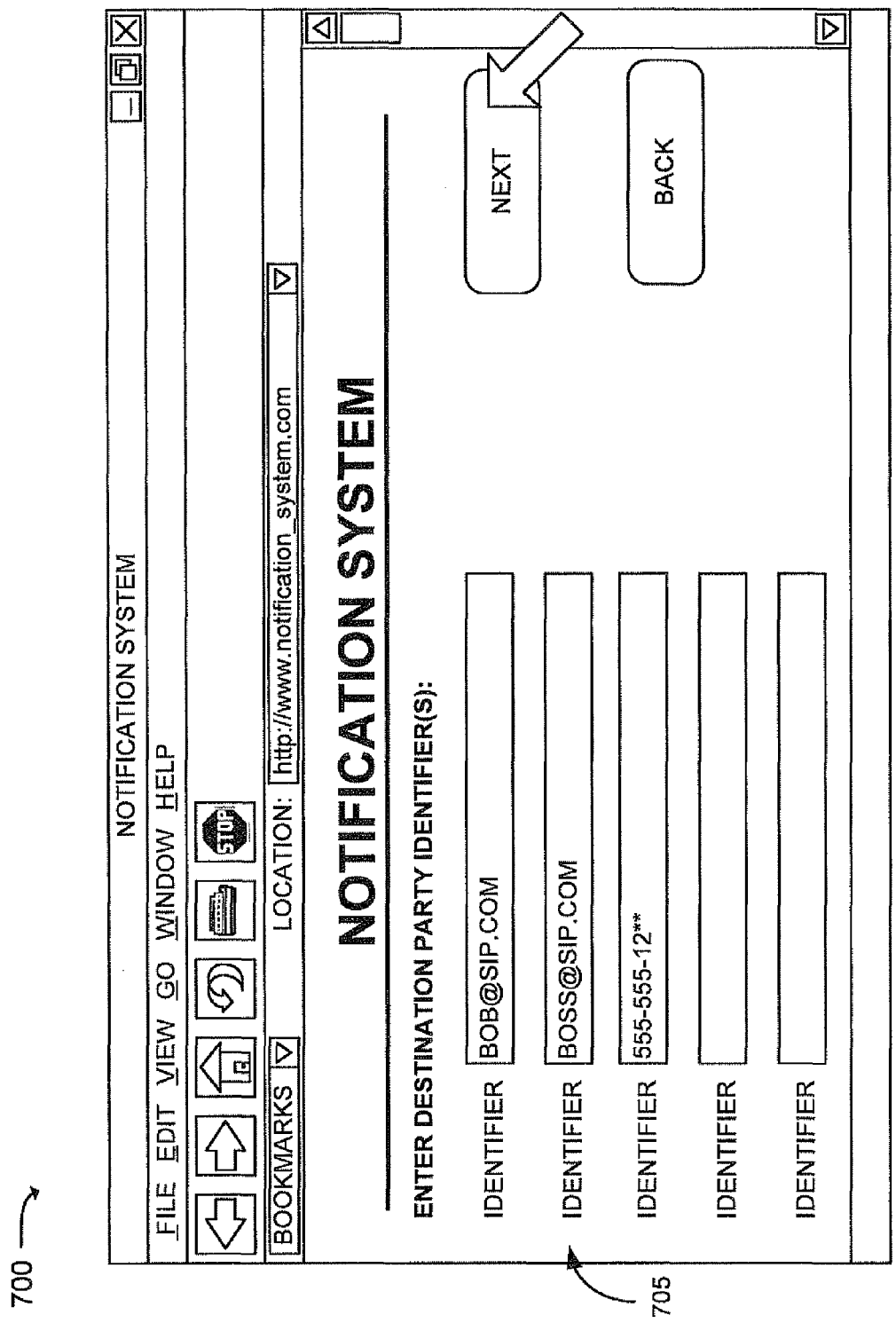
FIGS. 7A-7F are exemplary graphical user interfaces that may allow a user to define parameters for a multimedia outbound notification according to an exemplary embodiment.

FIGS. 7A-7F provide an example 700 of graphical user interfaces that may be provided to a user in relation to blocks 610 and 620 of FIG. 6. Assume that a user has accessed multimedia outbound notification device 130 to define an outbound notification that is to be provided. Assume further that multimedia outbound notification device 130 has provided a graphical user interface 705 that allows the user to identify one or more destination party identifiers for the outbound notification, as illustrated in FIG. 7A. The destination party identifiers may include a name, a telephone number, a URI, an e-mail address, an IM address, and/or other types of identifiers. In one embodiment, the identifiers may include one or more wild card characters, such as an asterisk. In example 700, the user has entered the following destination party identifiers: BOB@SIP.COM, BOSS@SIP.COM, and 555-555-12**. Alternatively or additionally, a user may specify a location from which multimedia outbound notification device 130 may obtain destination party identifiers, such as from a contact list or database of destination party identifiers.

Figure 7B:
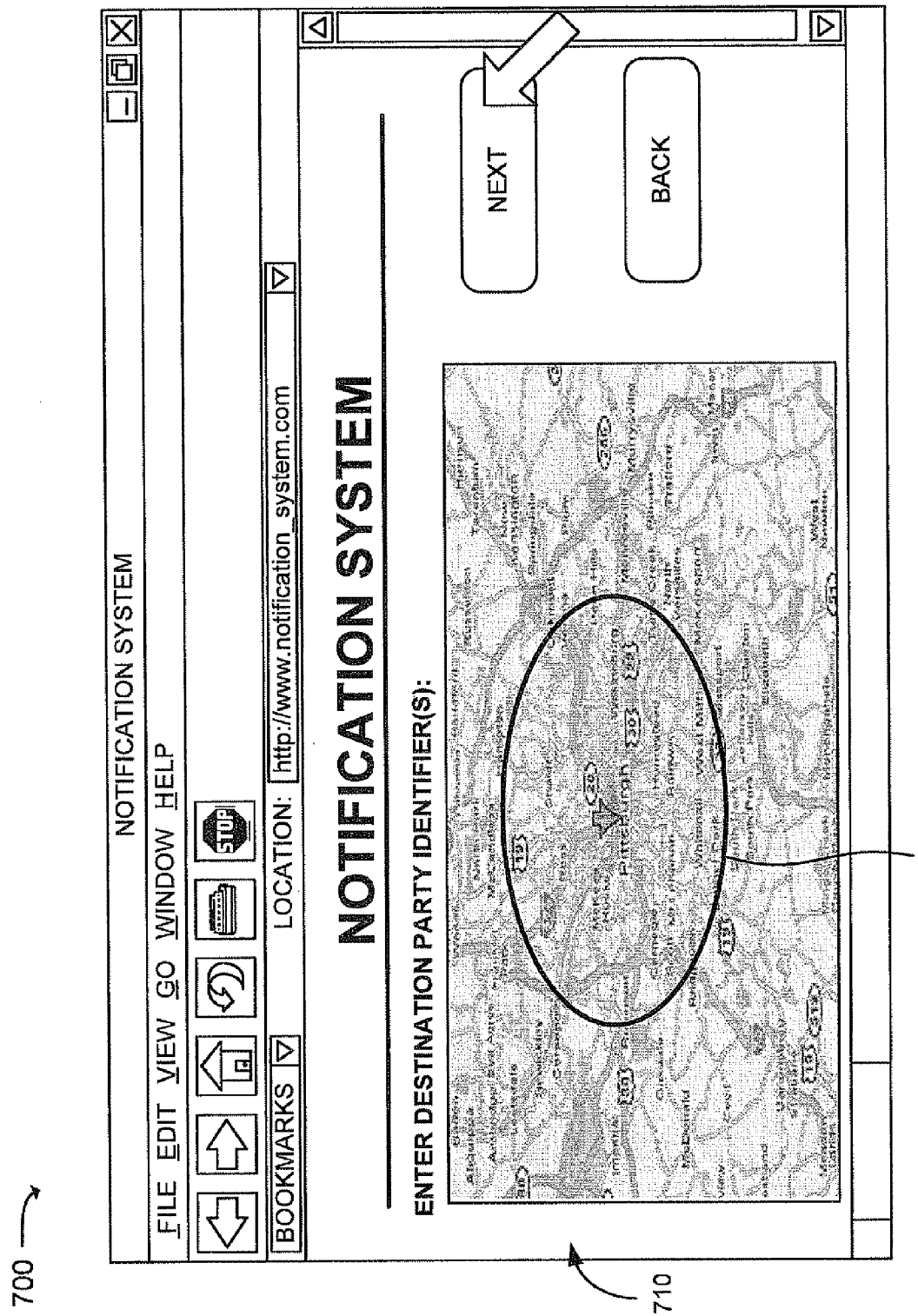

The user may specify destination party identifiers in other ways. For example, as illustrated in FIG. 7B, multimedia outbound notification device 130 may provide a Geographic Information System (GIS) graphical user interface 710 to the user to allow the user to specify an area 715 on a map for which destination party identifiers are to be obtained. Thus, in FIG. 7B, multimedia outbound notification device 130 may automatically obtain destination party identifiers for users located within area 715. In one embodiment, multimedia outbound notification device 130 may obtain the destination party identifiers from a database that associates destination party identifiers with location information. An example of such a database is an Emergency 911 (E911) database.

Once the desired identifiers have been specified, the user may select the NEXT button. If the user decides not to provide a destination party identifier, the user may select the BACK button to return to, for example, an introductory graphical user interface.

Figure 7C:
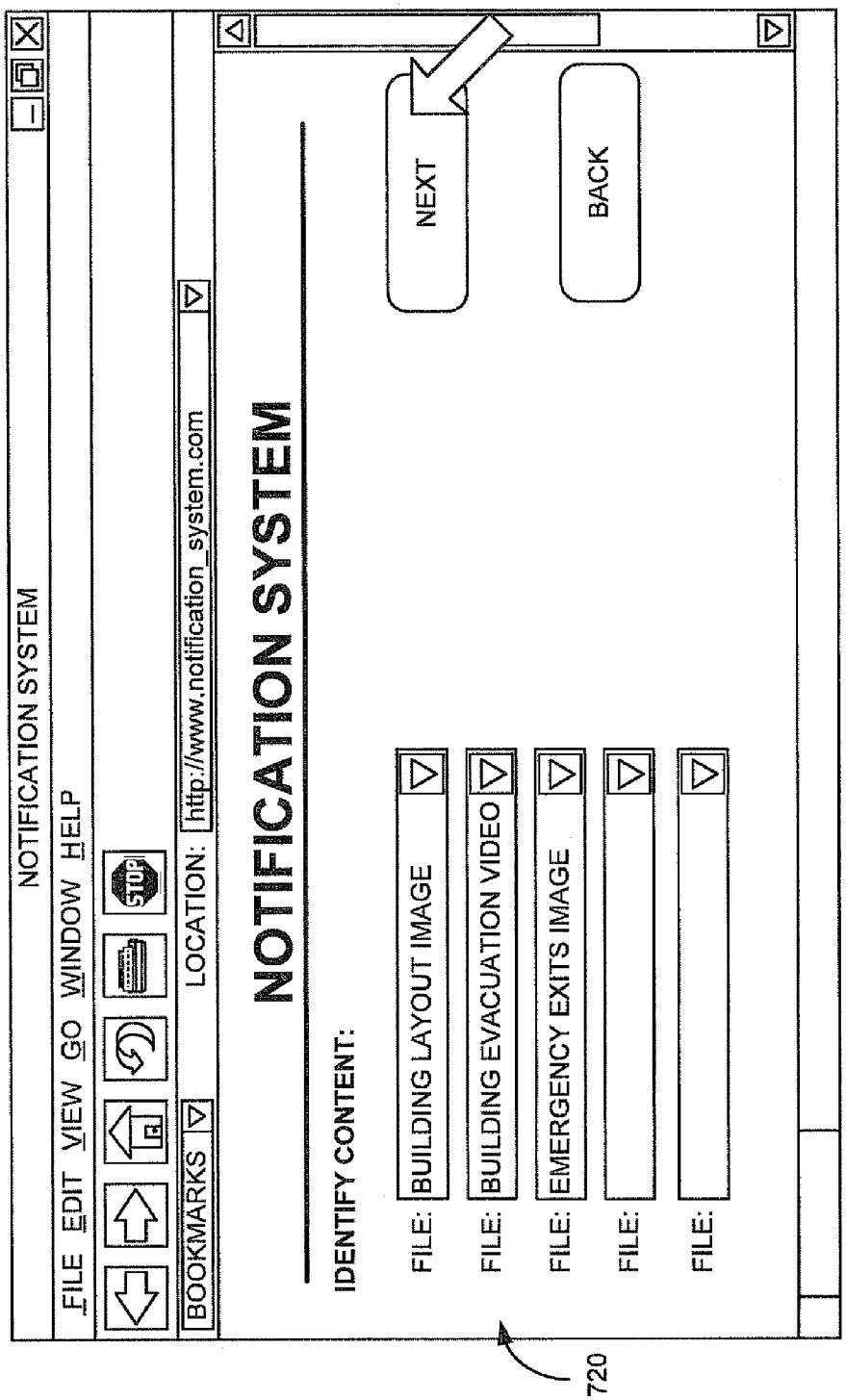

Multimedia outbound notification device 130 may provide a graphical user interface 720 that allows the user to identify multimedia content to be provided to the destination party (or parties), as illustrated in FIG. 7C. Graphical user interface 720 may allow the user to identify static and/or dynamic content that is to be combined to form a final content product. In some embodiments, a user may upload content to multimedia outbound notification device 130, may identify content stored at multimedia outbound notification device 130, may identify content to multimedia outbound notification device 130 from a pay or free web site, and/or may identify content in other ways. Also, graphical user interface 720 may allow the user to specify how content is to be combined. In example 700, the user has identified a building layout map, a building evacuation video, and an emergency exits image.

Figure 7D:
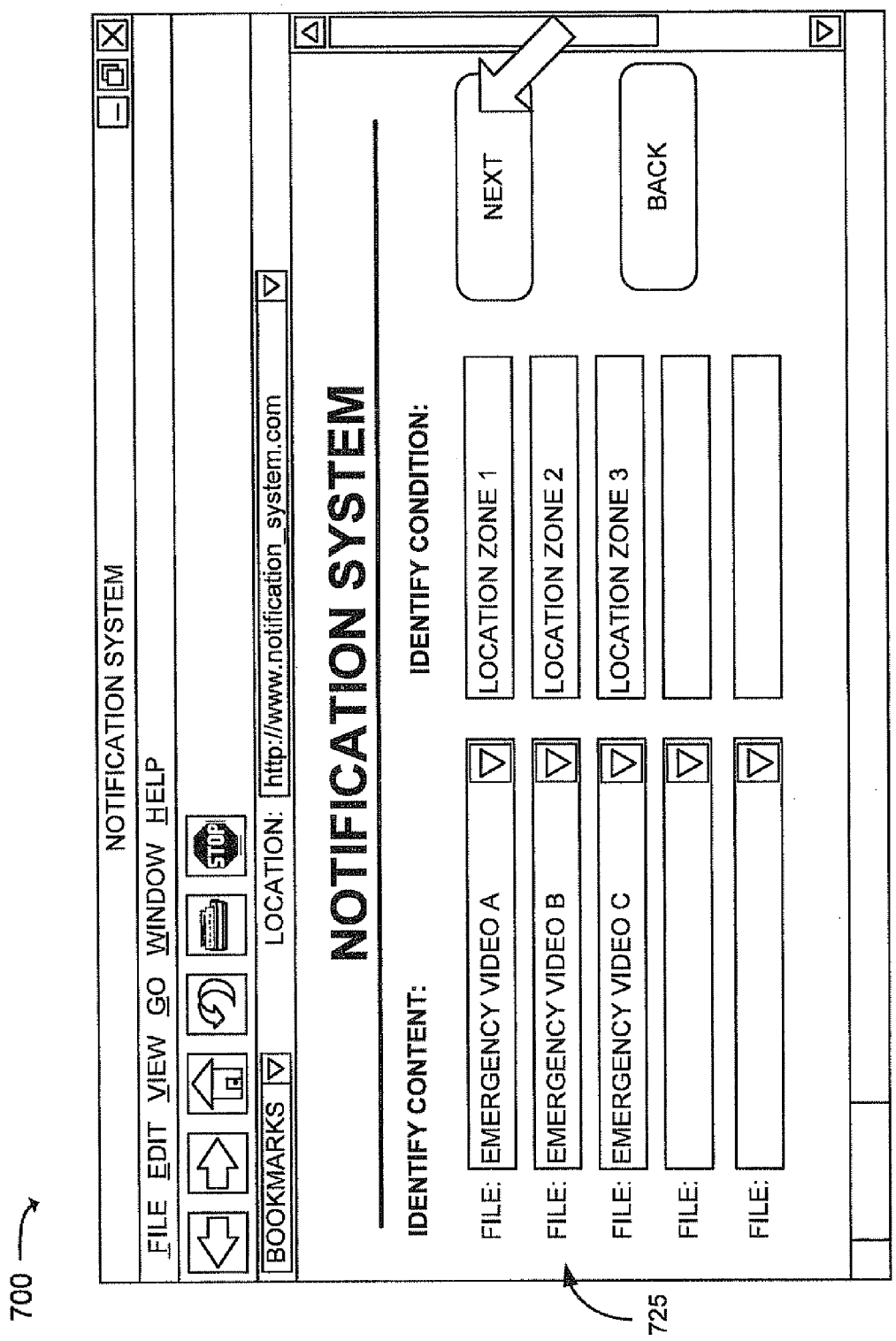

In some embodiments, multimedia outbound notification device 130 may allow a user to specify conditions when identified content is to be provided. For example, multimedia outbound notification device 130 may provide a graphical user interface 725 that allows the user to specify, for identified content, a condition under which that identified content is provided, as illustrated in FIG. 7D. In example 700, the user may identify that emergency video A is to be provided to users located in location zone 1 of a particular building, emergency video B is to be provided to users located in location zone 2 of the building, and emergency video C is to be provided to users located in location zone 3 of the building.

Once the desired content has been specified, the user may select the NEXT button. If the user decides not to specify content, the user may select the BACK button to return to, for example, graphical user interface 705/710.

Figure 7E:
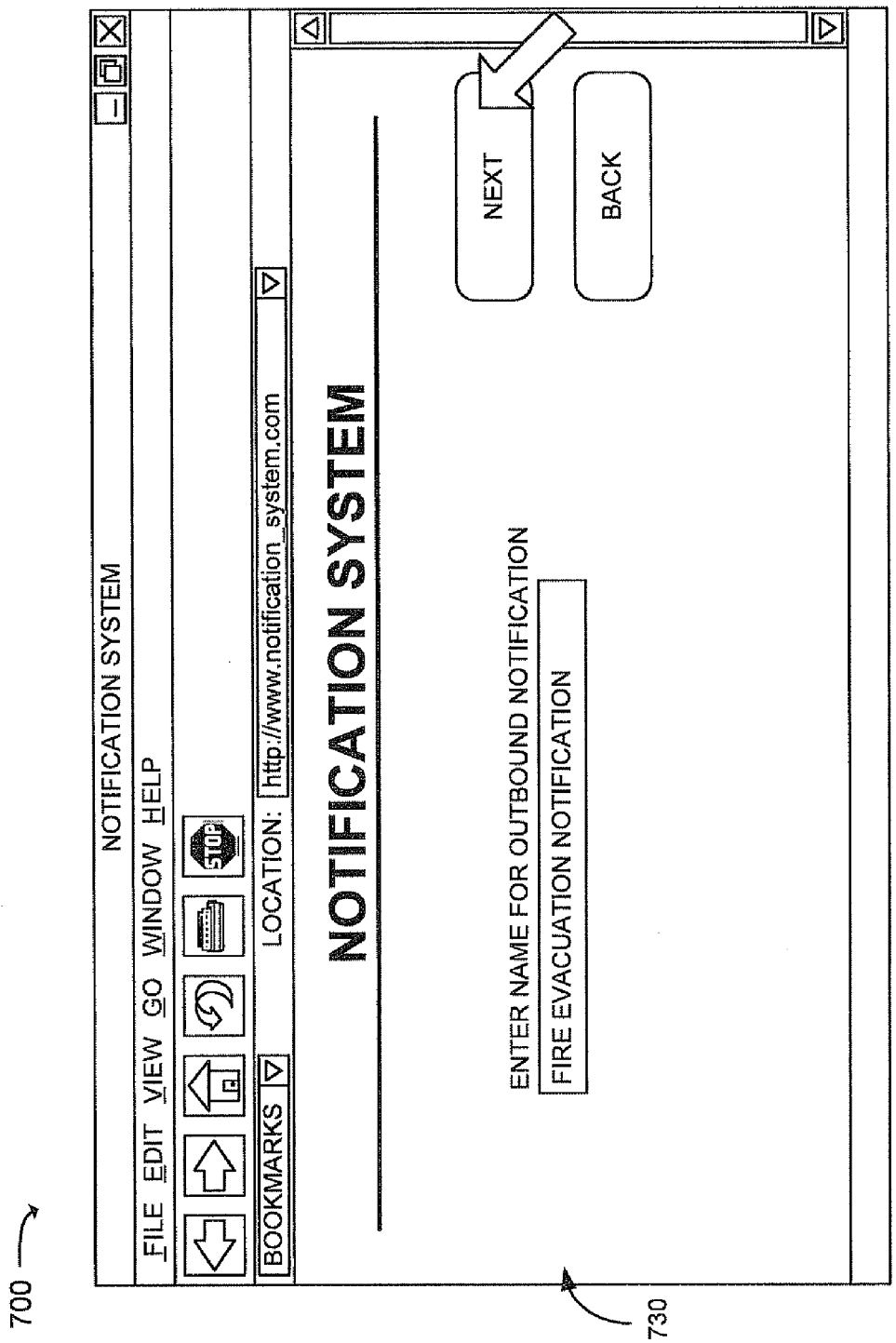

Multimedia outbound notification device 130 may provide a graphical user interface 730 that allows the user to provide a name for the outbound notification, as illustrated in FIG. 7E. Once provided, multimedia outbound notification device 130 may store the outbound notification name for later retrieval by multimedia outbound notification device 130. Once a name has been specified, the user may select the NEXT button. If the user decides not to specify a name, the user may select the BACK button to return to, for example, graphical user interface 720/725.

Figure 7F:
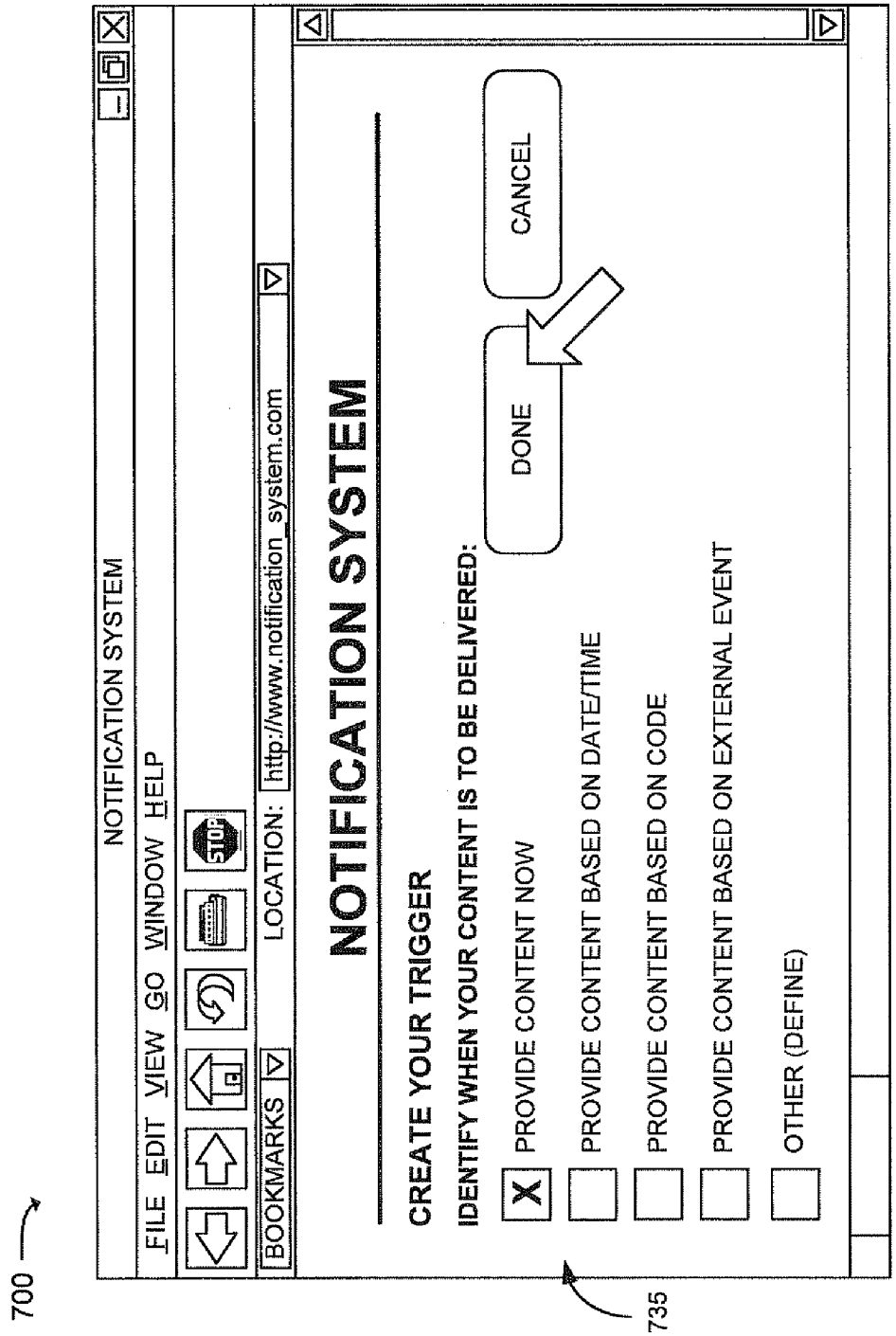

Multimedia outbound notification device 130 may provide a graphical user interface 735 that allows the user to identify when the content is to be provided to the destination party (or parties) associated with the destination party identifier(s), as illustrated in FIG. 7F. Graphical user interface 735 may, for example, provide the following exemplary factors from which the user may select: a provide content now factor (which may instruct multimedia outbound notification device 130 to provide the content to the destination parties immediately), a provide content based on time/date factor (which may cause multimedia outbound notification device 130 to provide one or more additional graphical user interfaces that allow the user to indicate a date and/or time at which the content is to be provided to the destination parties), a provide content based on code factor (which may cause multimedia outbound notification device 130 to provide one or more additional graphical user interfaces that allow the user to indicate a code that, when received by multimedia outbound notification device 130, causes multimedia outbound notification device 130 to provide the content to the destination parties), a provide content based on external event factor (which may cause multimedia outbound notification device 130 to provide one or more additional graphical user interfaces that allow the user to specify an event, such as a fire alarm being triggered, that, when detected by multimedia outbound notification device 130, causes multimedia outbound notification device 130 at provide the content to the destination parties), and an other factor. The user may select one or more of these factors by selecting the box next to the factor. Other ways of indicating a desired factor may alternatively be used.

Once all of the factors have been defined for the trigger, multimedia outbound notification device 130 may allow the user to verify the factors and save the trigger.

It will be appreciated that multimedia outbound notification device 130 may provide less, additional, or different graphical user interfaces than the graphical user interfaces described above. For example, multimedia outbound notification device 130 may provide one or more graphical user interfaces to the user of administration device 120 that allows the user to specify whether or not to store information relating to providing the content to the indicated destination party (or parties) (e.g., record what content was provided, to whom was the content provided, and when was the content provided, record the status of providing the content to the destination party (or parties), record a notification confirmation date and time for a notification that was acknowledged by the destination party, etc.). Additionally or alternatively, multimedia outbound notification device 130 may provide one or more graphical user interfaces to the user of administration device 120 that allows the user to indicate to where a transfer session request from a destination party is to be established (e.g., to the user associated with administration device 120, to a device that provides further details regarding the notification, etc.).

Figure 8:
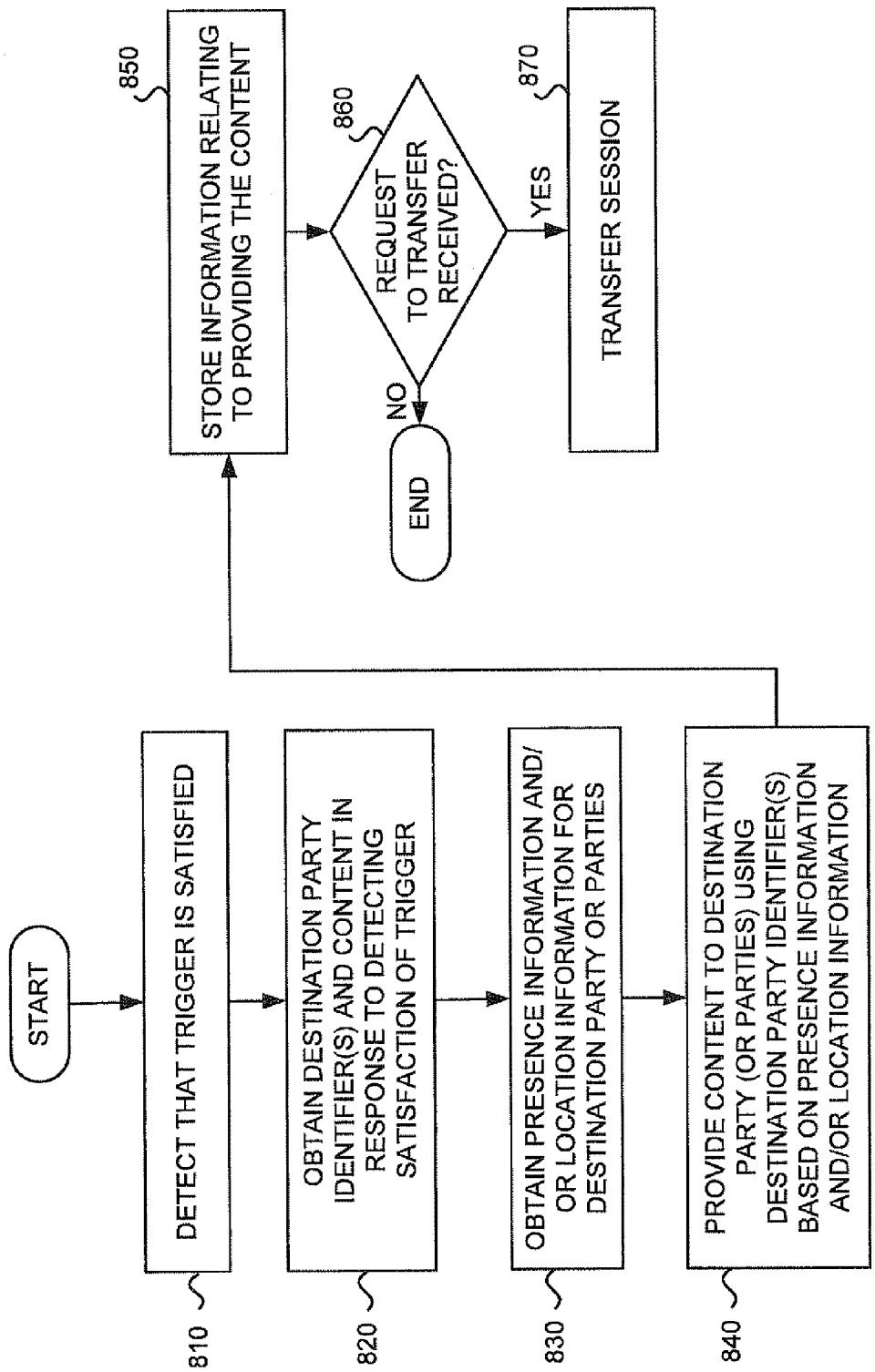
FIG. 8 is a flow chart of an exemplary process for providing a multimedia outbound notification according to an exemplary embodiment.

FIG. 8 is a flow chart of an exemplary process for providing a multimedia outbound notification consistent with exemplary embodiments. In one embodiment, the exemplary process of FIG. 8 may be performed by multimedia outbound notification device 130. In another embodiment, some or all of the exemplary process described below may be performed by another device, such as administration device 120, or combination of devices.

Assume that an administration user (e.g., a user associated with administration device 120) has specified destination party identifiers, final content products, and triggers in the manner described above. The exemplary process may begin with multimedia outbound notification device 130 (or another system, e.g., an IMS) detecting that a trigger has been satisfied (block 810). For example, multimedia outbound notification device 130 may analyze one or more factors to determine whether a trigger has been satisfied. As indicated above, the triggers may be based on one or more static and/or dynamic factors. For example, a trigger may be based on a time of day, day of year, a particular code (or other type of input) being received, one or more external factors (e.g., a factor relating to a current alarm condition, a factor relating to a current weather condition, a factor relating to a stock, a group of stocks, the stock market, etc., a factor relating to a sports team or group of sports teams, and/or other types of factors), etc. Multimedia outbound notification device 130 may analyze the appropriate factor(s) for each trigger in, for example, database 450, to determine whether a trigger has been satisfied. If multimedia outbound notification device 130 determines that more than one trigger is satisfied, multimedia outbound notification device 130 may give priority to one trigger over another based, for example, on priority information given to the triggers by the administration user.

Multimedia outbound notification device 130 may obtain destination party identifier(s) and the final content product associated with the trigger that has been satisfied (block 820). For example, multimedia outbound notification device 130 may obtain the destination party identifier(s) from a database, such as database 450, in response to multimedia outbound notification device 130 detecting that the trigger has been satisfied. Moreover, multimedia outbound notification device 130 may obtain an identifier for the final content product from a database, such as database 450, in response to multimedia outbound notification device 130 detecting that the trigger has been satisfied and use that identifier to obtain the multimedia content (and possibly combine multimedia content in real time) that makes up the final content product.

In one embodiment, multimedia outbound notification device 130 may obtain presence information and/or location information for the destination party identifier(s) (block 830). For example, multimedia outbound notification device 130 may lookup the presence and location information from a database that associates destination party identifiers with presence and location information for those identifiers. Alternatively, the presence and location information for the destination party identifiers may be obtained in other ways. For example, cellular triangulation, Global Positioning System (GPS) signals, etc. may be used for determining the location of a particular destination party associated with a destination party identifier.

Multimedia outbound notification device 130 may provide the final content product to the destination party (or parties) associated with the destination party identifier(s) (block 840). For example, multimedia outbound notification device 130 (e.g., via communication establishment component 330) may establish a session (or sessions) with the destination party (or parties) using the destination party identifier(s). In one embodiment, multimedia outbound notification device 130 may establish the session(s) with the appropriate user device(s) 110 based on the obtained presence information and/or location information. Once the session(s) is/are established, multimedia outbound notification device 130 (e.g., via communication establishment component 330) may provide the final content product to the destination party (or parties) at user device(s) 110. In one embodiment, multimedia outbound notification device 130 may provide the final content product based on information associated with the destination party. For example, if a user device 110 associated with the destination party does not contain audio capabilities, multimedia outbound notification device 130 may convert an audio portion of the final content product to text and provide the text to user device 110. As another example, multimedia outbound notification device 130 may provide the final content product in a preferred language or to a preferred user device 110 associated with a destination party.

Multimedia outbound notification device 130 may store information relating to providing the final content product to the destination party (or parties) (block 850). For example, multimedia outbound notification device 130 may store information identifying the final content product, when the final content product was provided, and to whom the final content product was provided. Additionally or alternatively, multimedia outbound notification device 130 may store information status information relating to providing the final content product (e.g., receipt acknowledged, pending, not delivered, not acknowledged, etc.).

In some embodiments, a destination party may cause one or more actions to be performed in response to receiving final content product from multimedia outbound notification device 130. For example, the destination party may request additional information relating to the received final content product. For example, if the final content product relates to a fire in the building, the destination party may request to be connected to an information conference bridge. In the example of the traveling sales representative provided above, the traveling sales representative may request that he/she be connected to the user of administration device 120 that caused the outbound notification to be transmitted to the traveling sales representative.

In this embodiment, multimedia outbound notification device 130 may determine whether a request for a transfer has been received from the destination party (block 860). The destination party may request the transfer verbally or in another manner (e.g., by selecting a particular sequence of characters on user device 110).

If multimedia outbound notification device 130 receives a request for transfer (block 860—YES), multimedia outbound notification device 130 may transfer the session to a particular device (block 870). For example, multimedia outbound notification device 130 may transfer the session to the user of administration device 120 that caused the outbound notification to be sent, to an informational conference bridge, to a contact indicated in the outbound notification, to a contact from the destination party's contact list, to a network device that provides audio/video (e.g., such as a real-time news stream, a real-time traffic camera video, etc.), etc. In an exemplary embodiment, information relating to the notification session, for example, what content was played to the destination user, date and time of notification of destination user, and location of destination user when notification was initiated, may be provided along with the transferred session.

If, on the other hand, multimedia outbound notification device 130 does not receive a request for transfer (block 860—NO), processing may end (e.g., returning to block 810 with multimedia outbound notification device 130 detecting that another trigger has been satisfied).

Figure 9B:
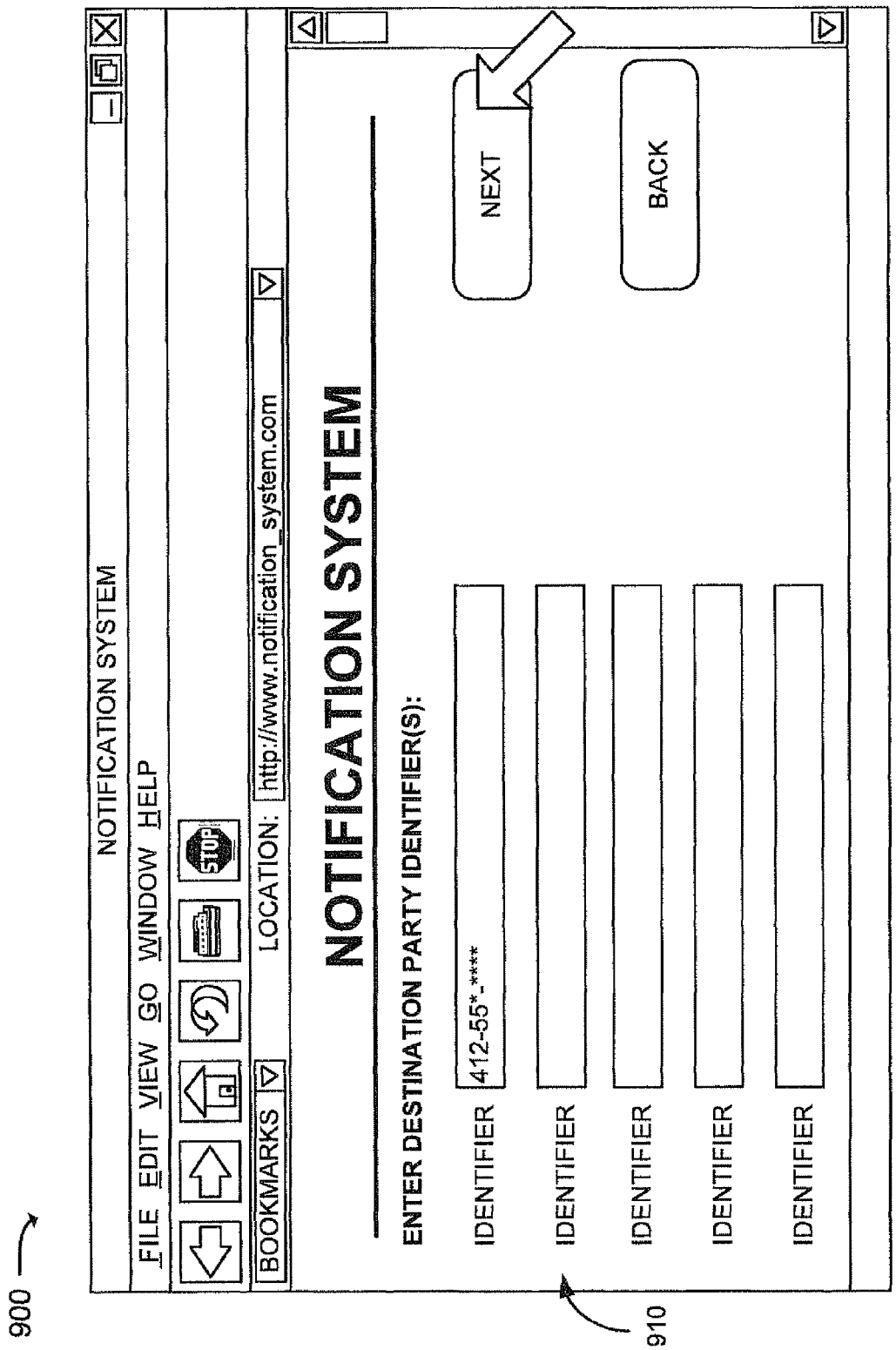

The following example 900 of FIGS. 9A-9J illustrates the processes described above with respect to FIGS. 6 and 8. Assume, for example 900, that a tornado was spotted in the downtown area of Pittsburgh, Penn. In response, assume that an administration user associated with administration device 120 establishes a session 905 with multimedia outbound notification device 130, as illustrated in FIG. 9A, to create an outbound notification to notify individuals in the Pittsburgh area that a tornado has been spotted and what emergency procedures they should take.

Assume that multimedia outbound notification device 130 provides a graphical user interface 910 to the administration user, as illustrated in FIG. 9B. Graphical user interface 910 may allow the administration user to identify one or more destination party identifiers for the outbound notification. The destination party identifiers may include a name, a telephone number, a URI, and/or other types of identifiers. In one embodiment, the identifiers may include one or more wild card characters, such as an asterisk. In example 900, the administration user has entered the following destination party identifier: 412-55*-****, which may correspond to individuals in the area of where the tornado has been spotted and/or in the direction where the tornado may be heading. Once the desired identifiers have been provided, the user may select the NEXT button.

Figure 9C:
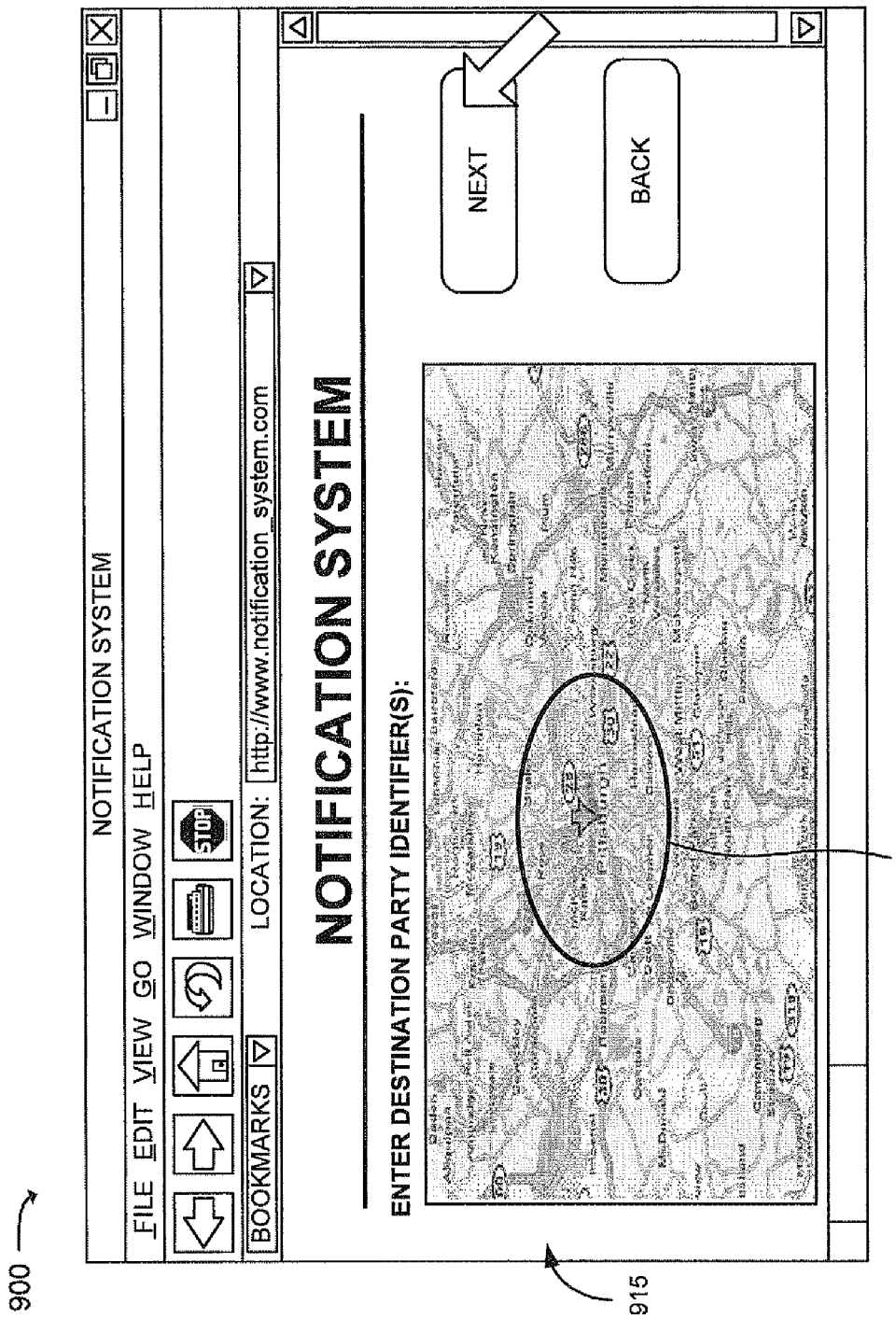

As an alternative to or in addition to providing graphical user interface 910, multimedia outbound notification device 130 may provide a graphical user interface 915 to the administration user, as illustrated in FIG. 9C. Graphical user interface 915 may allow the administration user to geographically identify an area 920 for which destination party identifiers are to be obtained. Area 920 may correspond to an area where the tornado was spotted and/or an area where the tornado is likely heading. More than one area 920 may be specified by the administration user. In response to the administration user specifying area 920, multimedia outbound notification device 130 may obtain destination party identifiers for individuals in area 920 from, for example, a database or databases that associate geographic information with destination party identifiers. Once area 920 has been identified, the user may select the NEXT button.

Figure 9D:
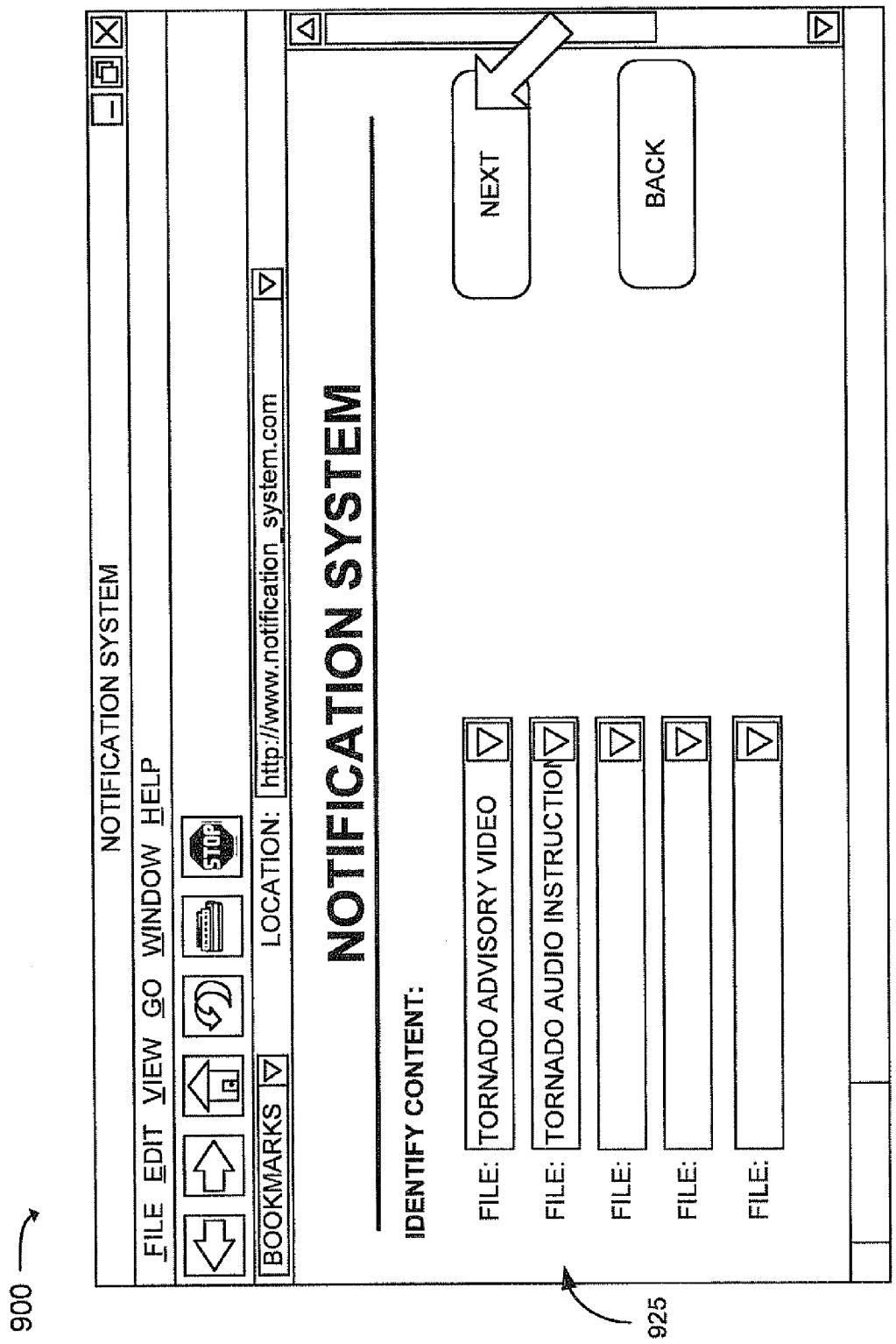

Multimedia outbound notification device 130 may provide a graphical user interface 925 that allows the administration user to identify multimedia content to be provided to the destination parties, as illustrated in FIG. 9D. Graphical user interface 925 may allow the user to identify the location of content that is to be provided as part of the outbound notification. The location may be, for example, a location on multimedia outbound notification device 130 (e.g., in main memory 230 or storage device 250) or a location on a different network device, such as a server. The content may be static or dynamic. As illustrated in FIG. 9D, assume that the user has identified a tornado advisory video and tornado audio instructions and selects the NEXT button.

Figure 9E:
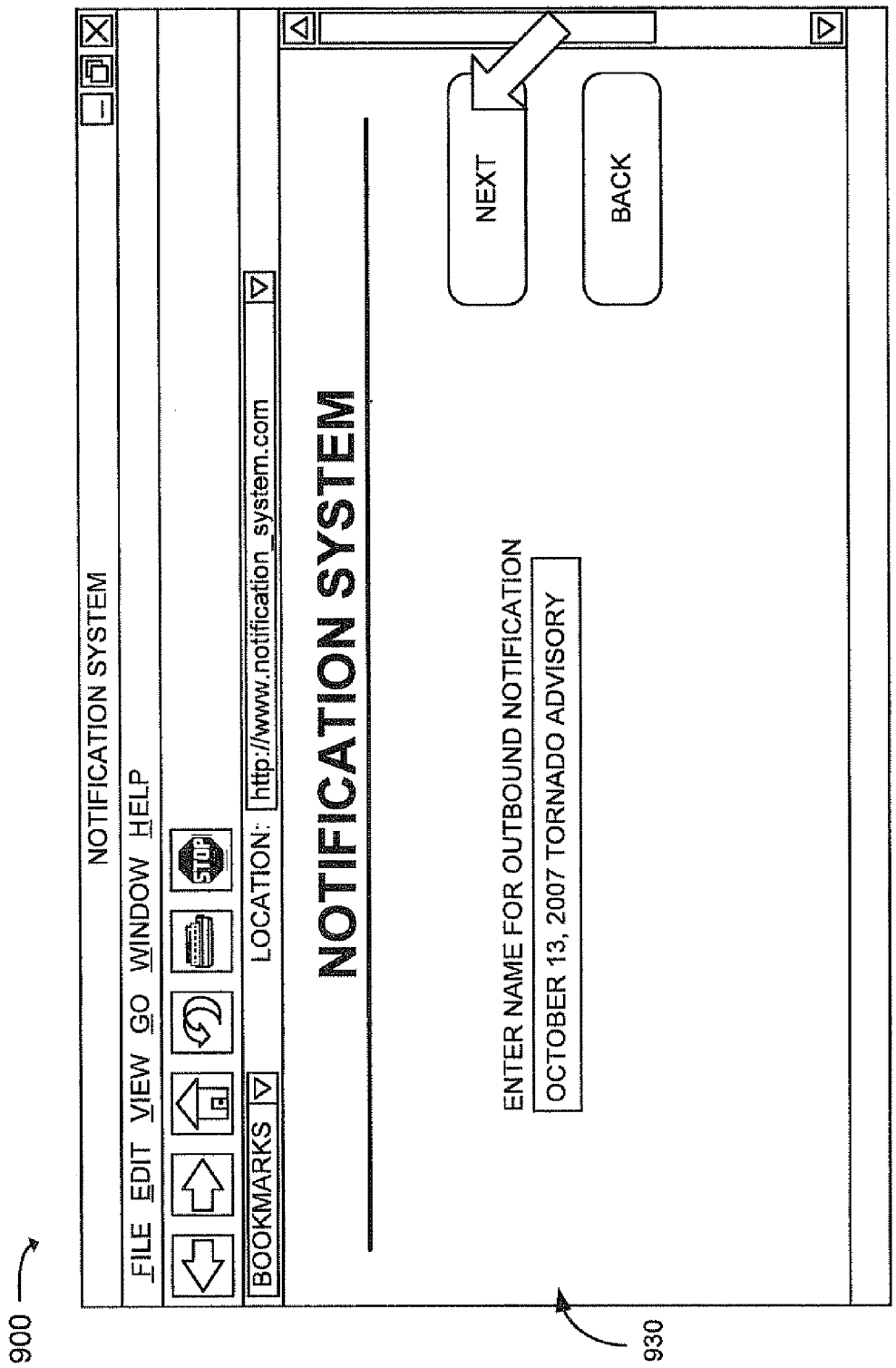

Multimedia outbound notification device 130 may provide a graphical user interface 930 that allows the administration user to associate a name with the outbound notification, as illustrated in FIG. 9E. Assume, as illustrated in FIG. 9E, that the user names the outbound notification as "Oct. 13, 2007 Tornado Advisory," and selects the NEXT button.

Figure 9F:
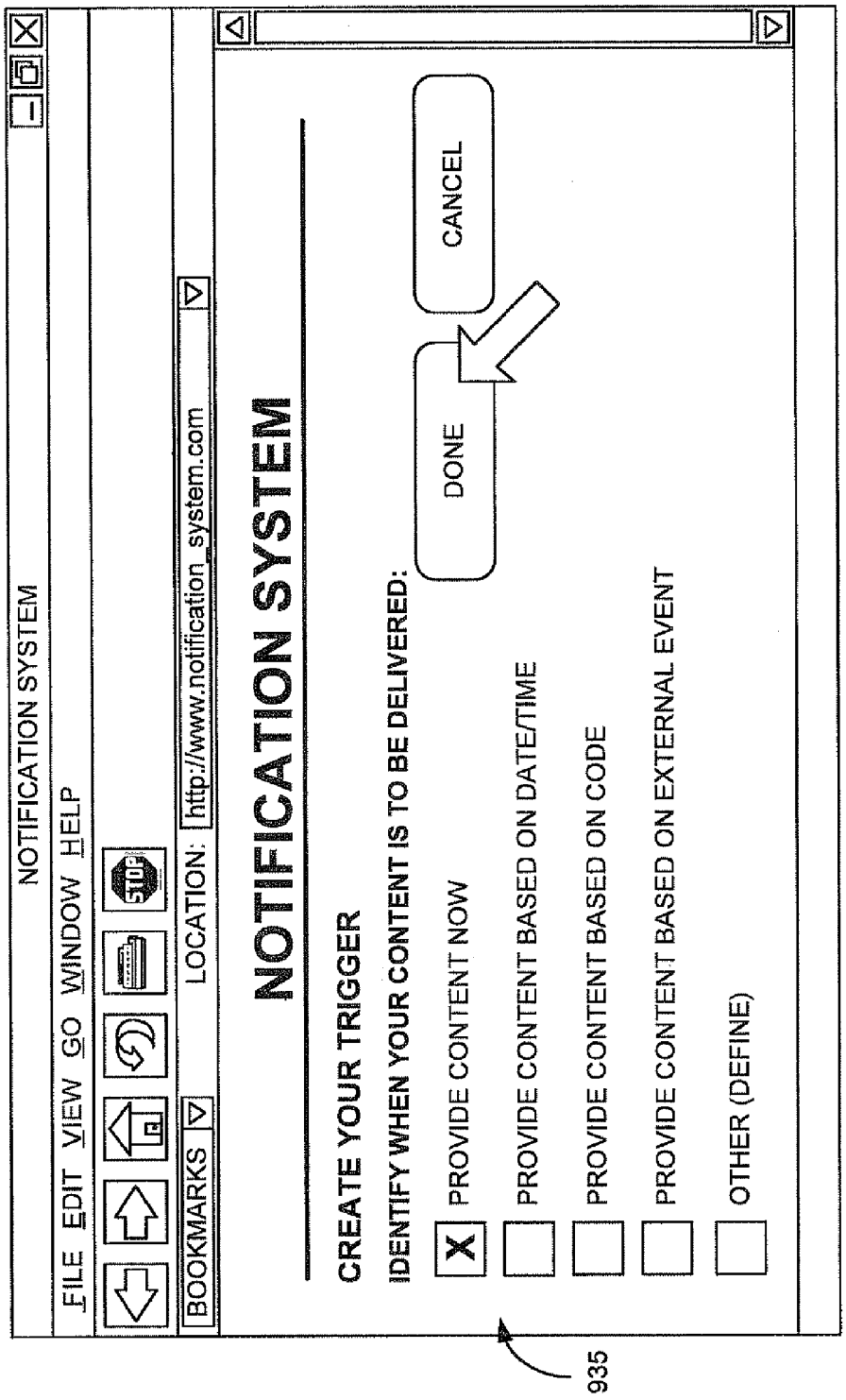

Assume that multimedia outbound notification device 130 provides a graphical user interface 935, as illustrated in FIG. 9F. Graphical user interface 935 may allow the administration user to specify when the outbound notification will be provided. Since the spotting of a tornado is a potentially life-threatening situation, assume that the administration user specifies that the outbound notification is to be provided immediately, as illustrated in FIG. 9F.

In response to this indication by the administration user, multimedia outbound notification device 130 may establish sessions with the appropriate user devices 110 using the destination party identifiers specified by the administration user, as illustrated in FIG. 9G. The sessions may be established sequentially, simultaneously, or a combination thereof. For example, multimedia outbound notification device 130 may establish a session with a first group of user devices 110, then with a second group of user devices 110, etc. until sessions have been established with all of the specified destination parties.

Once established, multimedia outbound notification device 130 may provide the final content product, as illustrated in FIG. 9G. In example 900, the final content product may include a tornado advisory video and tornado audio instructions. Upon receipt at user device 110, the final content product may be rendered to the destination party, as illustrated in FIG. 9H. For example, user device 110 may display a tornado advisory video 940 and audibly provide tornado audio instructions 945.

Assume, for example 900, that the destination party desires to obtain additional information regarding the tornado. Therefore, the destination party may cause user device 110 to send a request for additional information 950 to multimedia outbound notification device 130, as illustrated in FIG. 9I. The request may be provided verbally by the destination user or by selecting a sequence of characters on user device 110.

In response to receiving request 950, multimedia outbound notification device 130 may transfer the session between multimedia outbound notification device 130 and user device 110 to an emergency broadcast device 955, as illustrated in FIG. 9J. Emergency broadcast device 955 may provide an emergency broadcast announcement 960 relating to the tornado. In this way, the destination party may obtain additional information relating to the tornado.

Figure 10B:
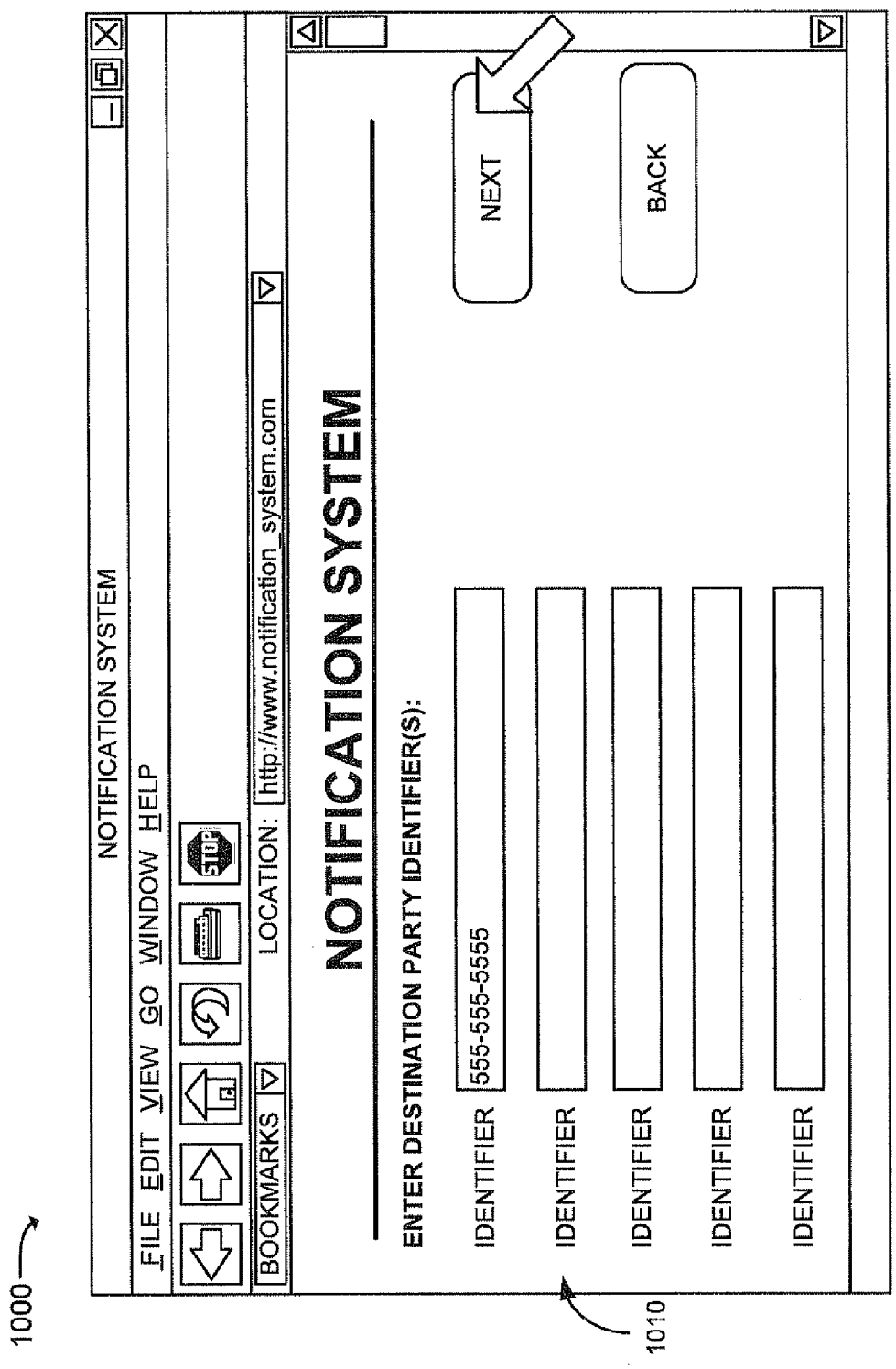

FIGS. 10A-10I provide another example 1000 of the processes described above with respect to FIGS. 6 and 8. Assume, for example 1000, that a wife wants to create an outbound notification for her husband that provides the husband with information about picking up their child from a soccer game. In response, assume that the wife establishes a session 1005 with multimedia outbound notification device 130 using administration device 120, as illustrated in FIG. 10A.

Assume that multimedia outbound notification device 130 provides a graphical user interface 1010 to the wife, as illustrated in FIG. 10B. Graphical user interface 1010 may allow the wife to identify one or more destination party identifiers for the outbound notification. In this situation, the wife may provide a destination party identifier for the husband, which, as illustrated in FIG. 10B is 555-555-5555. Once the desired identifier has been provided, the wife may select the NEXT button.

Figure 10C:
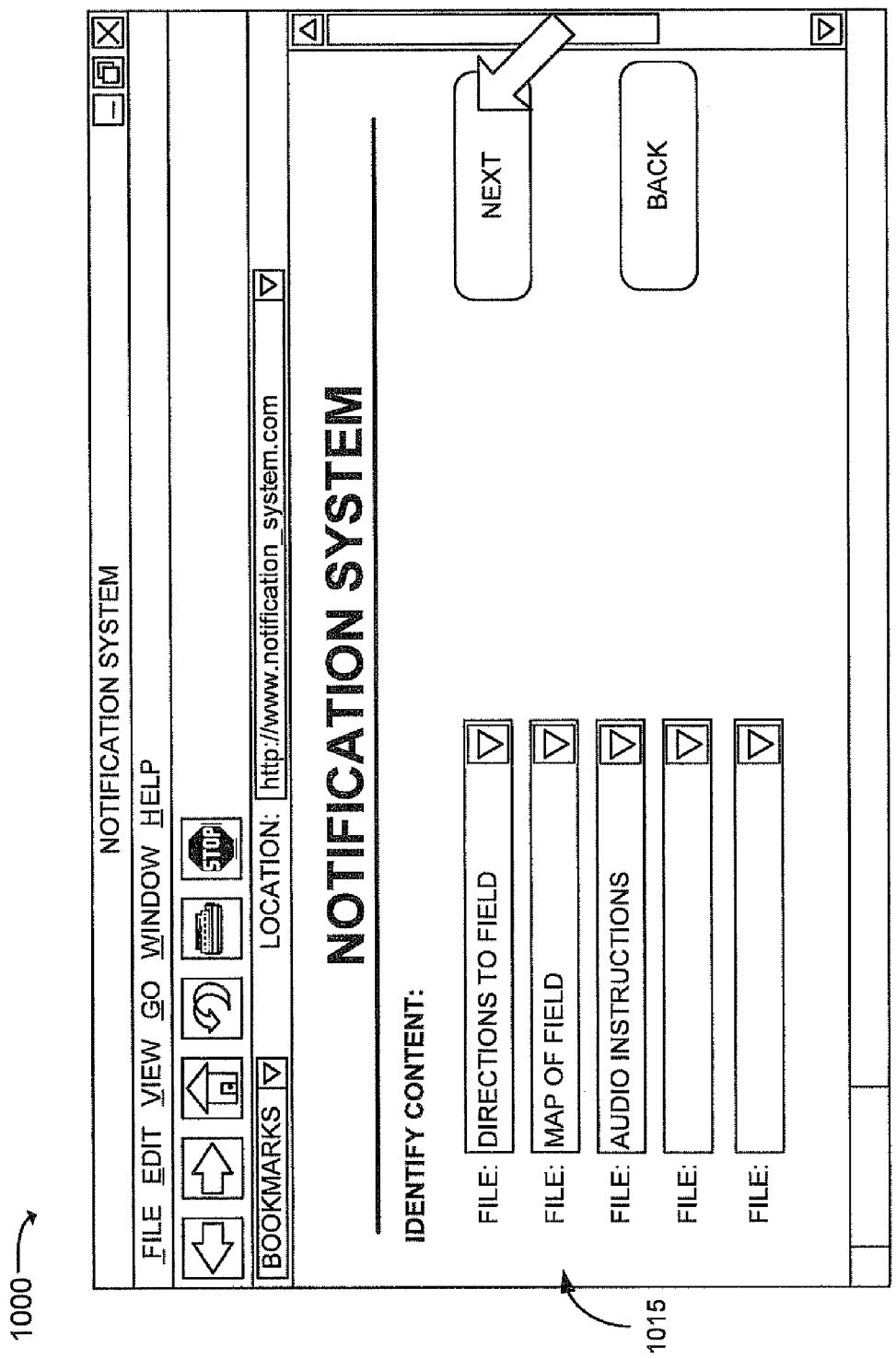

In response, multimedia outbound notification device 130 may provide a graphical user interface 1015, as illustrated in FIG. 10C. Graphical user interface 1015 may allow the wife to identify a location of the multimedia content to be provided to the husband. The location may be, for example, a location on multimedia outbound notification device 130 (e.g., in main memory 230 or storage device 250) or a location on a different network device, such as a server and/or administration device 120. The content may be static (e.g., a map of the field and audio instructions for picking up the child) or dynamic (e.g., driving directions from a detected location of the husband). As illustrated in FIG. 10C, assume that the wife identifies that directions to the soccer field are to be provided (e.g., based on a specified location of the husband or based on a detected location of the husband), along with a map of the soccer field (possibly containing an "X" indicating where the child will be) and audio instructions, and selects the NEXT button.

Figure 10D:
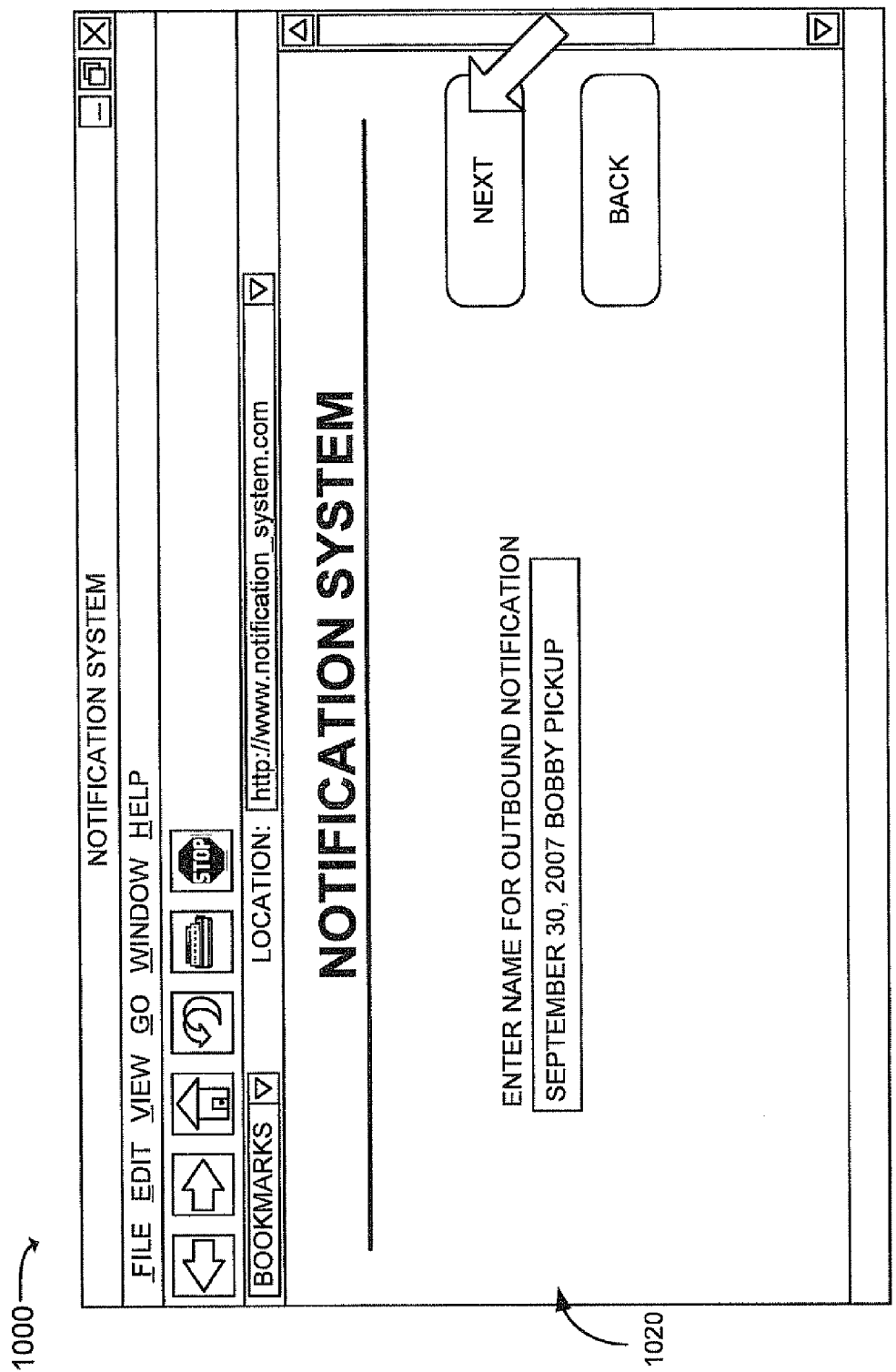

Multimedia outbound notification device 130 may provide a graphical user interface 1020 that allows the wife to associate a name with the outbound notification, as illustrated in FIG. 10D. Assume, as illustrated in FIG. 10D, that the wife names the outbound notification as "Sep. 30, 2007 Bobby Pickup," and selects the NEXT button.

Figure 10E:
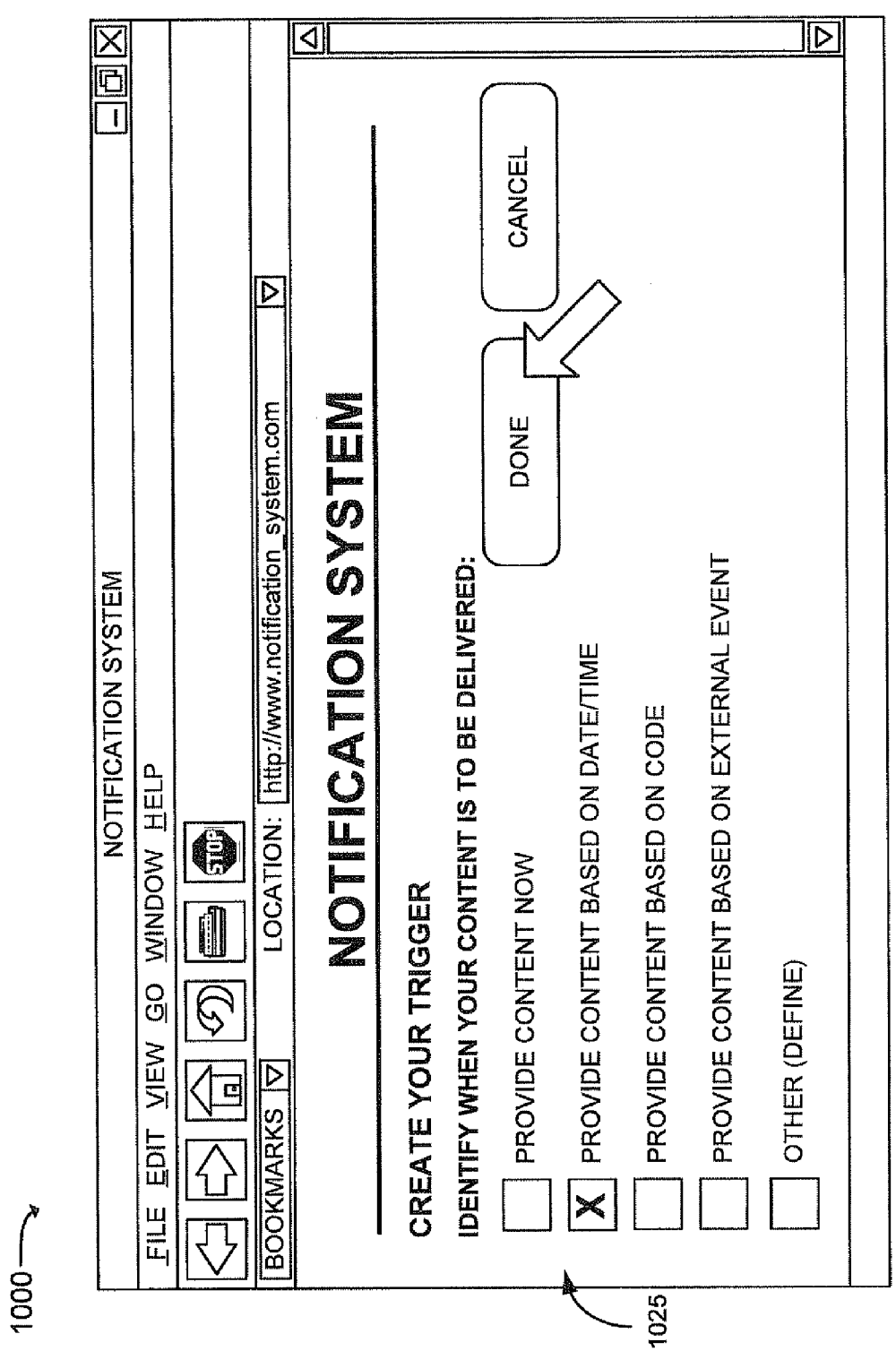

Assume that multimedia outbound notification device 130 provides a graphical user interface 1025, as illustrated in FIG. 10E. Graphical user interface 1025 may allow the wife to specify when the outbound notification will be provided. In this situation, the wife may elect to have the outbound notification delivered at a certain date and time. Thus, as illustrated in FIG. 10E, the wife may select the provide content based on date/time option.

Figure 10F:
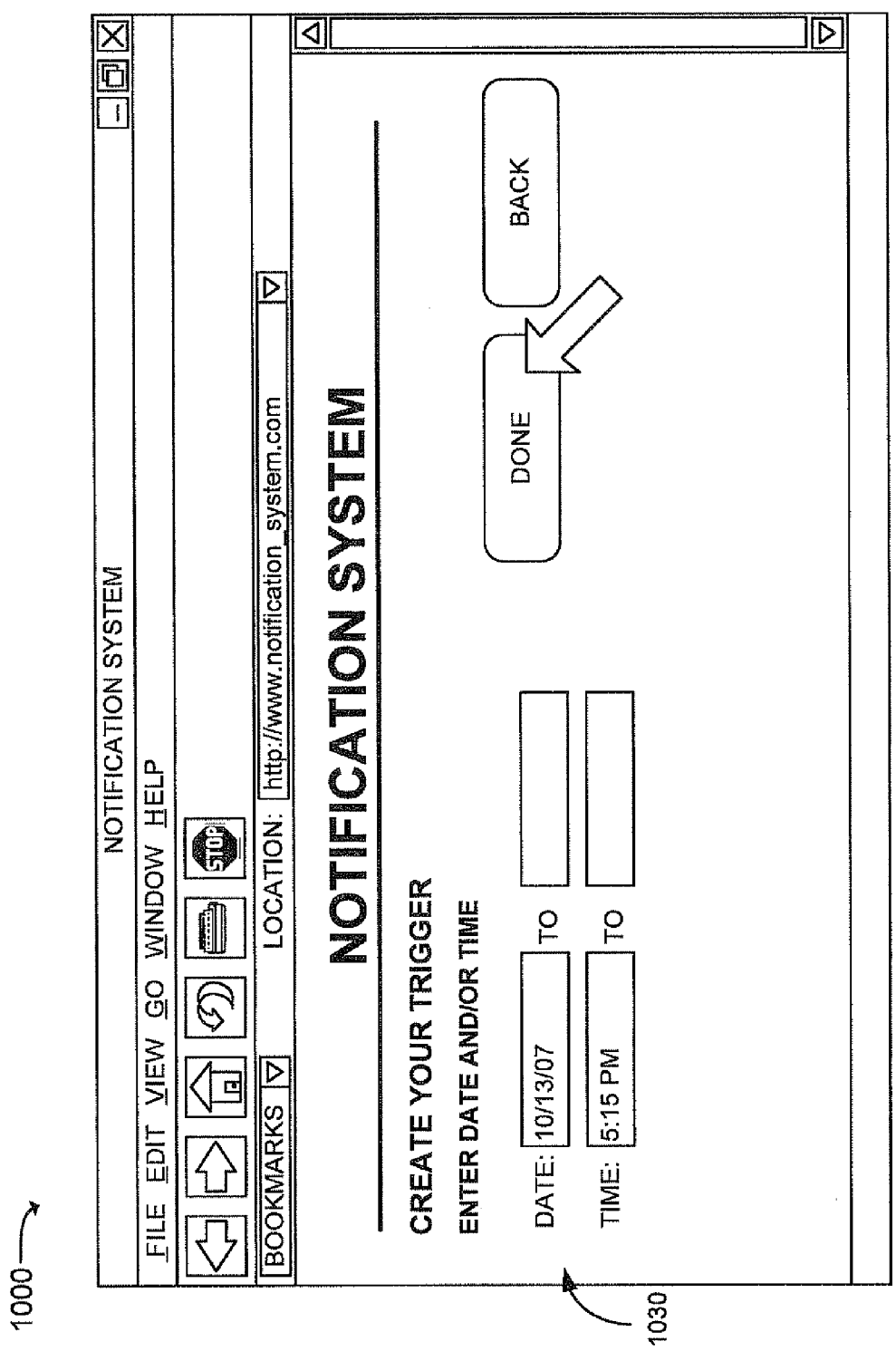

In response to this selection by the wife, multimedia outbound notification device 130 may provide a graphical user interface 1030, as illustrated in FIG. 10F. Graphical user interface 1030 may allow the wife to specify a date and/or time when the outbound notification will be delivered. In example 1000, assume that the wife has entered Oct. 13, 2007 as the date and 5:15 PM as the time. Upon selection of the DONE button, multimedia outbound notification device 130 may store the outbound notification and trigger.

Figure 10G:
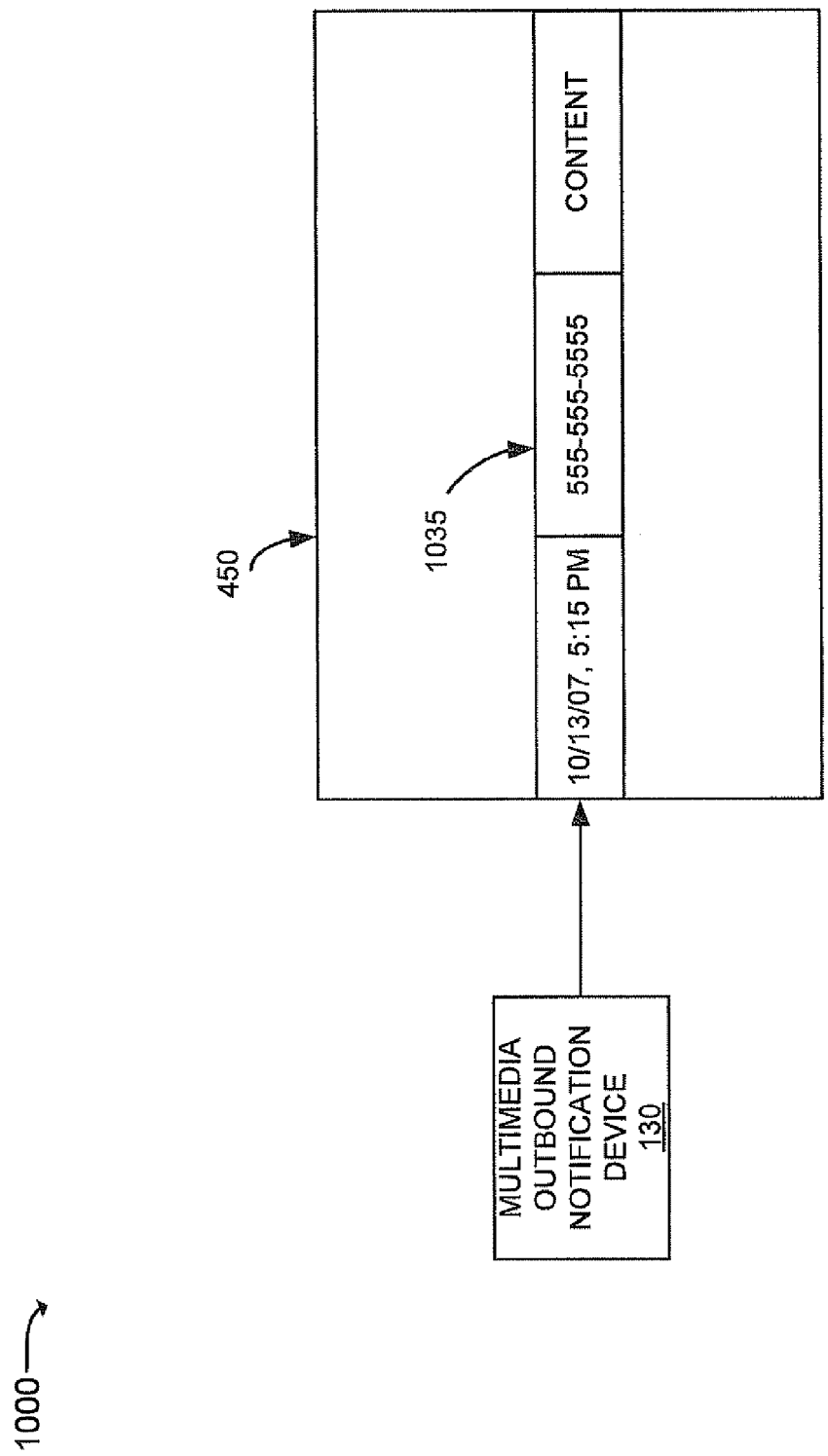

At the proper date and time (i.e., on Oct. 13, 2007, at 5:15 PM), multimedia outbound notification device 130 may access database 450 and retrieve entry 1035, as illustrated in FIG. 10G. Multimedia outbound notification device 130 may establish a session with a user device 110 associated with the husband using the destination party identifier from entry 1035, as illustrated in FIG. 10H. In example 1000, multimedia outbound notification device 130 may use presence and location information associated with the husband's destination party identifier to identify the appropriate user device 110 with which the session is to be established.

Once established, multimedia outbound notification device 130 may provide a final content product 1040 to the husband, as illustrated in FIG. 10H. In example 1000, final content product 1040 may include dynamic content (e.g., driving directions that are obtained based on the location information obtained for the husband) and static information (e.g., a map of the soccer field and audio instructions from the wife). Upon receipt at user device 110, final content product 1040 may be rendered to the husband, as illustrated in FIG. 10H. For example, user device 110 may display the map and driving directions and audibly provide the audio instructions.

Figure 10I:
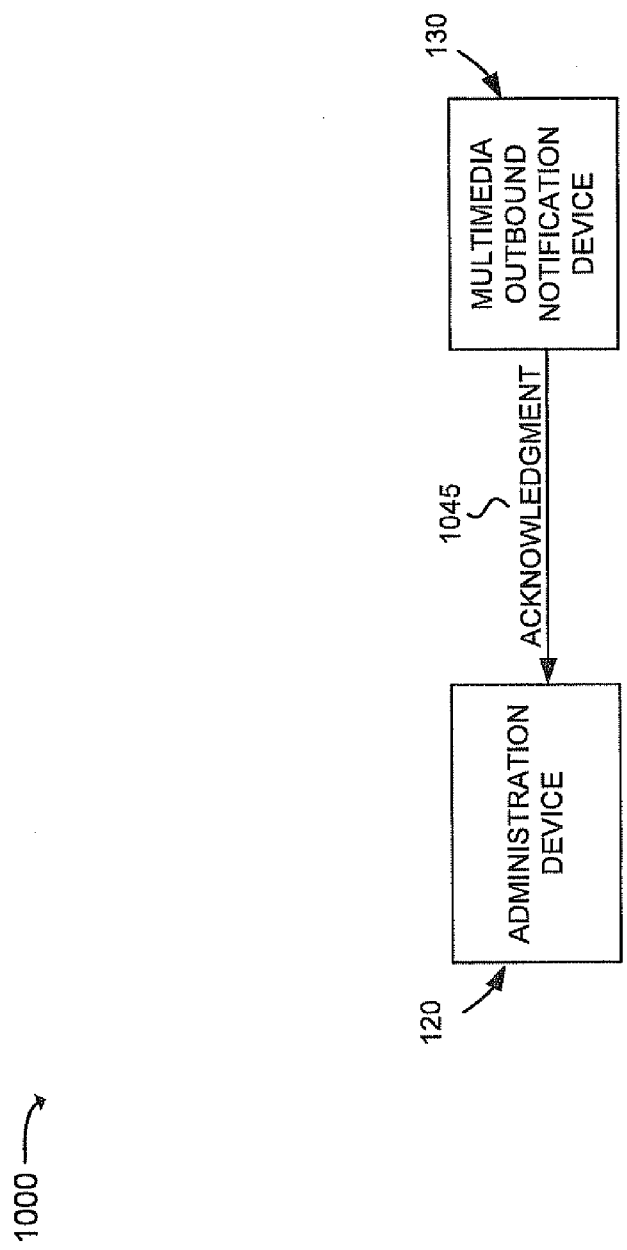

Upon receipt of final content product 1040 at user device 110, during rendering of final content product 1040, and/or following the rendering of final content product 1040, user device 110 may, as illustrated in FIG. 10H, send an acknowledgment 1045 to multimedia outbound notification device 130 indicating that final content product 1040 was successfully received, is in the process of being rendered, has been rendered, etc. Multimedia outbound notification device 130 may store acknowledgment 1045 and possibly information relating to when final content product 1040 was provided, the destination party identifier to which it was provided, and/or information identifying the content provided in final content product. Multimedia outbound notification device 130 may provide acknowledgment 1045 (possibly with the other information stored by multimedia outbound notification device 130) to administration device 120 in response to a request from administration device 120, in response to receiving acknowledgment 1045, or at other times, as illustrated in FIG. 10I.

Embodiments described herein provide a device that allows users to provide multimedia outbound notifications to other users in a scheduled or ad hoc manner.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 6, and 8, the order of the blocks may be varied in other embodiments. Moreover, non-dependent blocks may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
one or more instructions which, when executed by a processor of a device, cause the processor to:
receive, from a first user device and via a first graphical user interface, first information identifying multimedia content,
receive, from the first user device and via a second graphical user interface, selection of second information identifying one or more triggers from a plurality of triggers provided via the second graphical user interface,
the one or more triggers causing the multimedia content to be delivered as an outbound notification,
the plurality of triggers including information that causes the multimedia content to be delivered immediately and information identifying a time to deliver the multimedia content,
receive, from the first user device and via a third graphical user interface, destination party identification information,
detect, based on the first information, that the trigger has been satisfied, obtain the multimedia content based on detecting that the trigger has been satisfied and based on the second information, obtain the destination party identification information based on detecting that the trigger has been satisfied, establish a session with a second user device using the obtained destination party identification information, and provide the obtained multimedia content to the second user device.

2. The non-transitory computer-readable medium of claim 1, where the trigger is satisfied based on:

at least one of:

the time, or a code received from the second user device, the code causing the multimedia content to be provided to the user when the code corresponds to a code included in the first information, and at least one of:

a weather condition, or a status of an alarm.

3. The non-transitory computer-readable medium of claim 1, where the multimedia content includes:

an audio file, a video file, and at least one of:

an image file, a text message, or content dynamically retrieved from a remote device.

4. The non-transitory computer-readable medium of claim 1, where the instructions further comprise:

one or more instructions to obtain at least one of presence information or location information associated with the destination party identification information, and where the one or more instructions to establish the session include:

one or more instructions to establish the session with the second user device based on the obtained at least one of the presence information or the location information.

5. The non-transitory computer-readable medium of claim 1, where the instructions further comprise:

one or more instructions to receive a request from the second user device to transfer the session, and one or more instructions to transfer the session to a different device based on receiving the request.

6. The non-transitory computer-readable medium of claim 5, where the one or more instructions to transfer the session include:

one or more instructions to transfer the session to a device of a contact of a user associated with the destination party identification information, and one or more instructions to at least one of:

transfer the session to the first user device, transfer the session to an informational conference bridge, or transfer the session to a device that provides at least one of audio information or video information.

7. The non-transitory computer-readable medium of claim 1, where the instructions further comprise:

one or more instructions to obtain status information relating to a progress of providing the multimedia content to the second user device and information identifying a portion of the multimedia content that has been provided to the second user device, and one or more instructions to store the status information and the information identifying the portion of the multimedia content that has been provided to the second user device.

8. The non-transitory computer-readable medium of claim 7, where the instructions further comprise at least one of:

one or more instructions to provide the status information and the information identifying the portion of the multimedia content, provided to the second user device, to the first user device based on receiving a request from the user, or one or more instructions to provide the status information and the information identifying the portion of the multimedia content provided to the second user device to the first user device based on obtaining the status information.

9. The non-transitory computer-readable medium of claim 1, where the multimedia content includes an audio portion, and where the one or more instructions to provide the multimedia content to the second user device include:

one or more instructions to cause the audio portion to be converted from a first language to a second language.

10. A device comprising:

a memory to store instructions; and a processor to execute the instructions to:

provide a map to a user, receive, from the user, selection of at least one area on the provided map, obtain a first group of one or more destination party identifiers based on the received selection of the at least one area, provide a first graphical user interface to the user, receive, from the user and via the first graphical user interface, a second group of one or more destination party identifiers, at least one destination party identifier, of the second group of one or more destination party identifiers, including one or more wildcard characters, receive, from the user and via a second graphical user interface, information identifying multimedia content, the second graphical user interface being different than the first graphical user interface, receive, from the user and via a third graphical user interface, selection of information identifying one or more triggers, from a plurality of triggers provided via the third graphical user interface, that causes the multimedia content to be delivered as an outbound notification, the third graphical user interface being different than the first graphical user interface and the second graphical user interface, the plurality of triggers including information that causes the multimedia content to be delivered immediately and information identifying a time to deliver the multimedia content, establish, based on detecting that the one or more triggers have been satisfied, a session with a plurality of user devices based on the first group of destination party identifiers and the second group of destination party identifiers, and provide, based on detecting the one or more triggers, the multimedia content to the plurality of user devices, using the established session.

11. The device of claim 10, where the multimedia content includes a video file, and at least one of:
an audible message,
a music file,
an image file,
a text message, or
content dynamically retrieved from a remote device.

12. The device of claim 10, where the processor is further to:
receive a request, from a user device of the plurality of user devices, to transfer the session, and
cause a new session to be established between the user device and another device, based on receiving the request.

13. The device of claim 10, where the processor is further to:
receive a request from a user device, of the plurality of user devices, to transfer the session,
transfer the session to a user device of the user, and
at least one of:
transfer the session to an informational conference bridge, or
transfer the session to another device that provides at least one of audio or video information.

14. The device of claim 10, where the processor is further to:
store status information relating to a progress of providing the multimedia content to the plurality of user devices and information identifying a portion of the multimedia content provided to the plurality of user devices, and
at least one of:
provide the status information and the information identifying the portion of the multimedia content provided to the plurality of user devices to the user based on receiving a request from the user, or
provide, to the user, the status information and the information identifying the portion of the multimedia content provided to the plurality of user devices based on determining the status information.

15. A method comprising:
detecting, by a device, selection of an area of a map provided by the device;
identifying, by the device, first destination party identification information based on detecting the selection of the area of the map;
receiving, by the device and via a first graphical user interface, second destination party identification information;
receiving, by the device and via a second graphical user interface, multimedia content;
receiving, by the device and via a third graphical user interface, information identifying a trigger, from a plurality of triggers, that causes the multimedia content to be delivered as an outbound notification,
the plurality of triggers including information that causes the multimedia content to be delivered immediately and information identifying a time to deliver the multimedia content;
detecting, by the device, that the trigger has been satisfied based on the information identifying the trigger;
obtaining, by the device, the multimedia content based on detecting that the trigger has been satisfied and based on the information identifying the multimedia content;
establishing, by the device, a session with a plurality of user devices using the first destination party identification information and the second destination party identification information; and providing, by the device, the obtained multimedia content to the plurality of user devices, using the established session.

16. The method of claim 15, where the trigger is based on:
a date range,
a period of time, and
at least one of:
a weather condition,
a status of an alarm, or
a command, from a user, to provide the multimedia content.

17. The method of claim 15, further comprising:
receiving a request from a first user device, of the plurality of user devices, to transfer the session;
transferring the session to a device of a user that caused the multimedia content to be provided to the first user device; and
at least one of:
transferring the session to an informational conference bridge,
transferring the session to a device of a contact of another user associated with the first user device, or
transferring the session to a device that provides at least one of audio information or video information.

18. The method of claim 15, further comprising:
providing, to a device of a party that caused the multimedia content to be provided to the first user device, a status of providing the multimedia content to the first user device and information identifying a portion of the multimedia content that has been provided to the first user device.

19. The method of claim 15, where the method further comprises:
converting at least a portion of the multimedia content from a first language to a second language; and
providing the multimedia content in the second language to second user device of the plurality of user devices.

20. A method comprising:
receiving, by a device and via a first graphical user interface, information identifying multimedia content;
receiving, by the device and via a second graphical user interface, a destination party identifier;
detecting, by the device and via a third graphical user interface, selection of information identifying a trigger from a plurality of triggers provided via the third graphical user interface,
the plurality of triggers including information that causes the multimedia content to be delivered immediately and information identifying a time to deliver the multimedia content,
the trigger causing the multimedia content to be delivered as an outbound notification;
detecting, by the device, that the trigger has been satisfied based on the information identifying the trigger;
obtaining, by the device, the multimedia content based on detecting that the trigger has been satisfied and based on the information identifying the multimedia content;
establishing, by the device, a first session with a first user device, using the destination party identifier, based on detecting that the trigger has been satisfied;
providing, by the device, the obtained multimedia content to the first user device using the first session;
receiving, by the device, a request, from a user of the first user device, to transfer the first session; and
at least one of:
transferring the first session from the device to a second user device to establish a second session between the first user device and the second user device, or transferring the session from the device to a third user device, associated with a contact of the user, to establish a third session between the first user device and the third user device.

21. The method of claim 20, where the multimedia content includes static content and dynamic content, the static content including an image file and the dynamic content including a video file.

22. The method of claim 20, where the information the identifying the multimedia content, the information identifying the trigger, and the destination party identifier are received from a user via the second user device, where the second user device includes a device that provides at least one of audible information or visual information, and where establishing the second session includes:
  providing to the second user device:
    information identifying a portion of the multimedia content that has been provided to the first user device, and
    at least one of:
      information identifying a date and a time when the multimedia content was provided to the first user device, or
      information identifying a location of the user when the multimedia content was provided to the first user device.

23. The method of claim 20, further comprising:

detecting selection of an area of a map provided by the device; and identifying another destination party identifier based on detecting the selection of the area of the map, where providing the obtained multimedia content includes:

providing the multimedia content to a user device associated with the other destination party identifier.

\* \* \* \* \*